US009335565B2

(12) United States Patent
Miller, IV et al.

(10) Patent No.: US 9,335,565 B2
(45) Date of Patent: May 10, 2016

(54) ATTACHABLE OPTICAL ELEMENT ARRANGEMENTS AND METHODS

(75) Inventors: Roy E. Miller, IV, Stow, OH (US);
Bahman Taheri, Shaker Heights, OH (US); Tamas Kosa, Hudson, OH (US); Jonathan Figler, Stow, OH (US);
Damien Burt, Akron, OH (US);
Christine Martincic, Cuyahoga Falls, OH (US); Eui-Yeul Park, Hudson, OH (US)

(73) Assignee: ALPHAMICRON INCORPORATED, Kent, OH (US)

( * ) Notice: Subject to any disclaimer, the term of this patent is extended or adjusted under 35 U.S.C. 154(b) by 634 days.

(21) Appl. No.: 13/146,657

(22) PCT Filed: Feb. 1, 2010

(86) PCT No.: PCT/US2010/022723
§ 371 (c)(1),
(2), (4) Date: Jul. 28, 2011

(87) PCT Pub. No.: WO2010/088596
PCT Pub. Date: Aug. 5, 2010

(65) Prior Publication Data
US 2011/0283431 A1    Nov. 24, 2011

Related U.S. Application Data

(60) Provisional application No. 61/148,515, filed on Jan. 30, 2009, provisional application No. 61/152,471, filed on Feb. 13, 2009.

(51) Int. Cl.
*G02F 1/1335*  (2006.01)
*G02C 7/10*   (2006.01)
(Continued)

(52) U.S. Cl.
CPC ............ *G02C 7/101* (2013.01); *A42B 3/226* (2013.01); *G02C 9/00* (2013.01); *G02F 1/1313* (2013.01); *G02F 1/13725* (2013.01); *Y10T 29/53* (2015.01)

(58) Field of Classification Search
CPC .................................................. G02B 27/0172
USPC ............................................... 349/11, 13, 14
See application file for complete search history.

(56) References Cited

U.S. PATENT DOCUMENTS

| 2,453,141 A | 11/1948 | Lange |
| 4,047,249 A | 9/1977 | Booth |

(Continued)

FOREIGN PATENT DOCUMENTS

| CN | 2800847 Y | 8/2006 | ............... A42B 3/18 |
| JP | 56-111828 A | 3/1981 | ............. G02B 27/22 |

(Continued)

OTHER PUBLICATIONS

MIT opens new "window" on solar energy, by Elizabeth A. Thomson, Jul. 10, 2008, http://www.mit.edu/newsoffice/2008/solarcells-0710.html.

(Continued)

*Primary Examiner* — Lucy Chien
(74) *Attorney, Agent, or Firm* — Renner Kenner Greive Bobak Taylor & Weber

(57) ABSTRACT

A light attenuating optical arrangement for assembly to an eye-shielding device includes an optical element having an electronically controlled guest-host liquid crystal cell for variably attenuating transmission of light, the liquid crystal cell including first and second plastic substrates. A controller is electrically connected to the liquid crystal cell and is configured to selectively supply a voltage across the liquid crystal cell. The controller is provided with a means for electrically connecting the controller to a power source, and a means for attaching the controller to the eye-shielding device. The optical element is provided with a means for attaching an outer periphery of the optical element to a surface of a viewing lens of an eye-shielding device.

26 Claims, 20 Drawing Sheets

(51) Int. Cl.
*A42B 3/22* (2006.01)
*G02C 9/00* (2006.01)
*G02F 1/13* (2006.01)
*G02F 1/137* (2006.01)

(56) References Cited

U.S. PATENT DOCUMENTS

| | | | |
|---|---|---|---|
| 4,584,721 A | 4/1986 | Yamamoto | |
| 4,863,244 A * | 9/1989 | Fuerthbauer et al. | 349/14 |
| 4,919,520 A | 4/1990 | Okada et al. | |
| 5,000,544 A * | 3/1991 | Staveley | 359/630 |
| 5,131,101 A | 7/1992 | Chin | |
| 5,172,256 A | 12/1992 | Sethofer et al. | |
| 5,177,816 A | 1/1993 | Schmidt et al. | |
| 5,315,099 A | 5/1994 | Gunz et al. | |
| 5,343,313 A | 8/1994 | Fergason | |
| 5,471,036 A | 11/1995 | Sperbeck | |
| 5,642,530 A | 7/1997 | Parks | |
| 5,671,483 A | 9/1997 | Reuber | |
| 5,756,010 A | 5/1998 | Appell et al. | |
| 5,765,235 A | 6/1998 | Arnold | |
| 5,802,622 A | 9/1998 | Baharad | |
| D411,900 S | 7/1999 | Puleo | D29/107 |
| 5,959,705 A * | 9/1999 | Fergason | 349/14 |
| 5,986,781 A * | 11/1999 | Long | 359/30 |
| D418,255 S | 12/1999 | Hohdorf | D29/107 |
| 6,101,256 A * | 8/2000 | Steelman | 381/91 |
| 6,102,033 A | 8/2000 | Baribeau | |
| 6,239,778 B1 | 5/2001 | Palffy-Muhoray et al. | |
| D451,643 S | 12/2001 | Kalhok | D29/107 |
| 6,324,702 B1 | 12/2001 | Spindelbalker | 2/435 |
| 6,405,373 B1 | 6/2002 | Grau | |
| 6,493,128 B1 | 12/2002 | Agrawal et al. | |
| 6,606,751 B1 | 8/2003 | Kalhok et al. | 2/424 |
| 6,690,495 B1 | 2/2004 | Kosa et al. | |
| 6,886,183 B2 | 5/2005 | DeHaan et al. | 2/6.7 |
| 6,922,850 B1 | 8/2005 | Arnold | |
| 7,007,306 B2 | 3/2006 | Howard et al. | 2/9 |
| 7,036,152 B2 | 5/2006 | Gafforio et al. | |
| D536,833 S | 2/2007 | Broersma | D29/107 |
| 7,303,302 B2 | 12/2007 | Harris | |
| D564,135 S | 3/2008 | Cherry et al. | D29/108 |
| 7,342,210 B2 | 3/2008 | Gergason | |
| D589,211 S | 3/2009 | Stevens et al. | D29/110 |
| 8,011,026 B2 | 9/2011 | Stevens | 2/427 |
| 2003/0052838 A1 | 3/2003 | Kim et al. | 345/32 |
| 2005/0002108 A1* | 1/2005 | Wilson et al. | 359/630 |
| 2005/0007504 A1 | 1/2005 | Fergason | 349/14 |
| 2005/0007506 A1 | 1/2005 | Faris et al. | |
| 2005/0068762 A1* | 3/2005 | Post et al. | 362/105 |
| 2006/0293092 A1 | 12/2006 | Yard et al. | |
| 2007/0151600 A1 | 7/2007 | Li et al. | |
| 2007/0153354 A1 | 7/2007 | Duston et al. | |
| 2008/0013000 A1 | 1/2008 | Park et al. | |
| 2009/0040296 A1* | 2/2009 | Moscato | 348/53 |
| 2009/0262411 A1* | 10/2009 | Karmhag et al. | 359/265 |
| 2010/0253603 A1* | 10/2010 | Righi et al. | 345/8 |

FOREIGN PATENT DOCUMENTS

| | | | | |
|---|---|---|---|---|
| JP | S62-121420 | 6/1987 | | G02C 7/10 |
| JP | S63-118123 | 5/1988 | | G02F 1/13 |
| JP | S64-10721 | 1/1989 | | G02F 1/13 |
| JP | 11-160659 | 6/1999 | | |
| JP | 2005-97823 | 4/2005 | | A42B 3/24 |
| WO | WO 01/13750 A1 | 3/2001 | | A42B 3/24 |
| WO | 2008/033290 | 3/2008 | | |
| WO | 2008/075286 | 6/2008 | | |

OTHER PUBLICATIONS

"High Efficiency Organic Solar Concentrators for Photovoltaics" by Currie, et al., Science, vol. 321, Jul. 11, 2008, pp. 226-228.

"MIT Brainstorms Alternative Energies" Photonics Spectra, Oct. 2008, pp. 46-47.

International Search Report for International Application No. PCT/US2010/022723 dated Mar. 16, 2010.

Written Opinion for International Application No. PCT/US2010/022723 dated Mar. 16, 2010.

International Search Report for International Application No. PCT/US2010/32396 dated Jun. 10, 2010.

Written Opinion for International Application No. PCT/US2010/32396 dated Jun. 10, 2010.

International Preliminary Report on Patentability for International Application No. PCT/US2010/32396 dated Aug. 2, 2011.

http://bo.aving.net/16767/a_num/114202; "*Helmet Visor Insert, capable of adjusting its tint electrically for motorcycle;* " AVING Global news network; Feb. 3, 2009.

Office Action mailed Jul. 5, 2013 in corresponding Chinese application No. 201080006113.2.

Office Action mailed Mar. 5, 2014 in corresponding Chinese application No. 201080006113.2.

Office Action mailed May 13, 2014 in corresponding Chinese application No. 201080006113.2.

Office Action mailed Oct. 23, 2014 in corresponding Chinese application No. 201080006113.2.

Extended European Search Report mailed Sep. 17, 2012 in corresponding application No. 10736520.7.

Office Action mailed Dec. 15, 2013 in corresponding Japanese application No. 2011-548370.

Office Action mailed Sep. 9, 2014 in corresponding Japanese application No. 2011-548370.

Office Action mailed Mar. 31, 2015 in corresponding Korean application No. 10-2011-7020099.

* cited by examiner

ATTACHABLE OPTICAL ELEMENT ARRANGEMENTS AND METHODS

CROSS-REFERENCE TO RELATED APPLICATIONS

The present application is a national phase entry under 35 U.S.C. §371 and claims priority to International Application No. PCT/US2010/022723, with an International Filing Date of Feb. 1, 2010 for ATTACHABLE OPTICAL ELEMENT ARRANGEMENTS AND METHODS, which claims priority to U.S. Provisional Patent Application Ser. No. 61/148,515, filed Jan. 30, 2009, for ATTACHABLE OPTICAL ELEMENT ARRANGEMENTS AND METHODS, and U.S. Provisional Patent Application Ser. No. 61/152,471, filed Feb. 13, 2009, for ATTACHABLE OPTICAL ELEMENT ARRANGEMENTS AND METHODS, the disclosures of each of which are all fully incorporated herein by reference.

BACKGROUND

Protective and performance enhancing helmets, goggles, and other such eye-shielding devices often provide protection for a wearer's eyes while maintaining or enhancing optical functionality for the wearer, for example, by magnifying, clarifying, darkening, tinting, or lightening ("bleaching") light transmission through a viewing lens of the device. To facilitate a desired optical performance, a viewing lens may be adapted to minimize, avoid, or compensate for a variety of conditions, including, for example, fog, condensation, sun glare, or darkness. One optical property sought by wearers of eye-shielding devices is the ability to absorb or reduce the amount of sunlight and/or glare in bright conditions. It is desirable that such light absorption be fast and reversible (so that the eye-shielding devoice returns to a "clear state" in the absence of bright light). Under certain conditions, the wearer should be able to control the amount of light-absorption or the tint of such a device. In other instances, an automatic response to light is required. It is also desirable to provide such a device in an "after market" kit which can be easily applied to any eye-shielding device. In some instances, it is advantageous to make such devices "removable" by the end-user.

In the past, "darkening" or "self-tinting" eye-protection devices have had a number of shortcomings. For example, some attempts have been made to integrate such devices into the viewing lens of an eye-shielding device, such as for example motorcycle helmets. However, such devices are typically an integral part of the visor of the helmet and have to be purchased and used with a particular helmet. Moreover, such devices are not separable or removable from the visor of the helmet.

Speed is also a factor. Many devices, for example photochromic devices, are slow to react to a change in light conditions. In addition, a user has no control over the color or amount of tint or light absorption of such a device, including the ability to "switch off" the device when not in use or when not needed.

Therefore it is desirable to provide a self-contained, freestanding device that can be applied to any eye-shielding device, such as a helmet visor, to provide a tinting or light-absorption function. It is also desirable that the change in tint of the viewing area occur more rapidly in response to light (such as sun-glare) or darker conditions than with conventional tint-adjusting devices. Moreover, in some instances, it is desirable that such a device be removable, so that the end user can remove it if he/she does not require its use. It is also desirable to provide a tinting or light-absorbing device with a mechanism whereby the user can exert control over the timing, the degree of the tinting or shading (darkness) and/or the color of the device. In other instances, however, it is desirable that the device react "automatically" to changes in light, with or without user input. Another desirable attribute is a device equipped with a master switch for tuning off the device when not is use, either to save battery life, or to stop the device from functioning if the user so desires.

SUMMARY

Disclosed herein are optical elements or inserts that provide optical enhancing properties to an eye-shielding device. The optical element includes an electronically controllable liquid crystal cell that can attenuate the transmission of light.

Accordingly, in one embodiment, an optical enhancing arrangement is presented comprising an optical element that includes a variable light-attenuating liquid crystal or photochromic-dichroic cell for variably attenuating transmission of light, and a controller for operating the optical element, wherein the optical element is configured to be attached to an eye-shielding device after manufacture of said eye-shielding device (i.e. an "after market" product).

Such an optical element may be configured to be removably or permanently attached to the viewing area of the device, for example, by a manufacturer, distributor, seller, or end user of the device.

An exemplary controller includes a drive circuit and an activator or activation circuit for applying a voltage across the liquid crystal cell. The controller may also include a user operable activating device, such as a switch or dial, or may be activated remotely by an activating device located in a location other than the controller itself In other embodiments, the controller may be additionally or alternatively controlled by an automatic controlling mechanism, such as a photosensor or light sensitive switch. The controller may include a power source, or be connected to a power source that is an integral part of the eye-shielding device. The controller may be an integral part of the optical element or a separate component configured to be attached to the eye-shielding device after manufacture of said eye-shielding device. The power source may be a battery (which may be rechargeable or not), or a solar cell, or a combination thereof.

In some embodiments, the controller is electrically connected to a photosensor for sensing the amount of incident visible or ultraviolet light. The photosensor may be integral to the optical element, or housed within the eye-shielding device.

In one embodiment, the optical enhancing arrangement is electronically adjustable to provide for automatic or user-controlled adjustment of the tint, shade, or light-absorption or reflection of the optical element, for example, in response to increases or decreases in brightness or glare, or to change the aesthetic appearance of the device. As used herein, a change in tint or shade may also include changing the hue (color) of the optical element. The arrangement may be provided with two (e.g., "on/off") or more tint or absorption settings which may be selectively adjusted by a user (e.g., by activating a switch) or automatically adjusted in response to changing light conditions (e.g., by electrical signals delivered from a photoreceptor to the liquid crystal cell panel), or adjusted by a combination of manual and automatic controls. In some embodiments, the controller is activated remotely.

In some embodiments, the controller includes a master switch for turning off the power to the optical element.

In other inventive embodiments, existing eye-shielding devices may be adapted to provide optical enhancing properties using kits containing an optical element and controller as described herein for attachment to the eye-shielding devices, after the manufacture of such devices.

Also described herein are inventive methods for altering the light absorption or transmission properties of a viewing area of an eye-shielding device using an optical enhancing arrangement as described herein.

BRIEF DESCRIPTION OF THE DRAWINGS

Features and advantages of the invention will become apparent from the following detailed description made with reference to the accompanying drawings, wherein.

DETAILED DESCRIPTION OF THE DISCLOSURE

Figure 1:
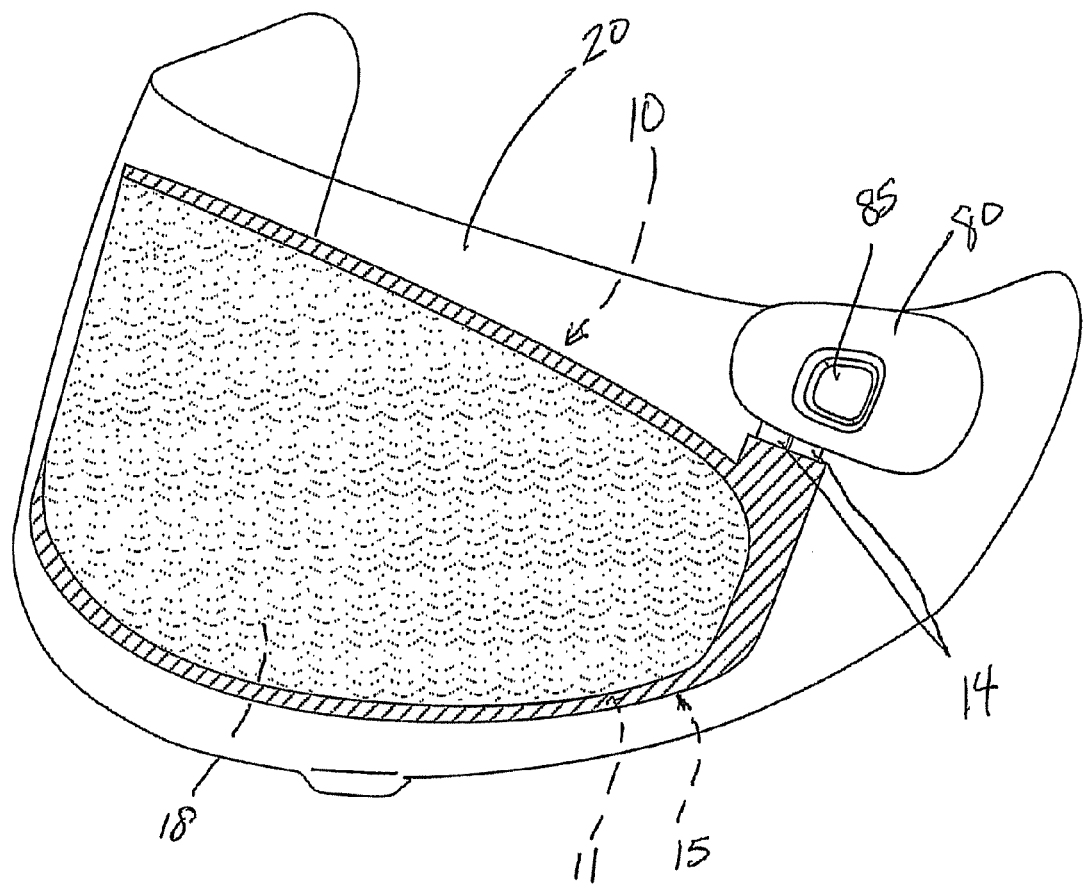
FIG. 1 is a front perspective view of a helmet visor with an electronically operable optical element and controller.
Figure 2:
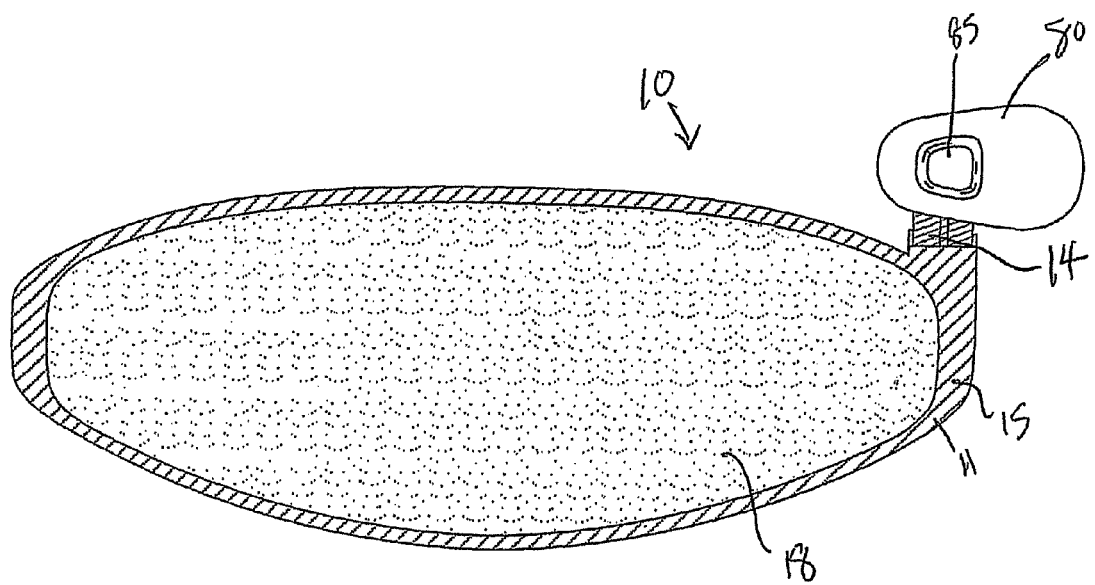
FIG. 2 is a front elevational view of the optical element and controller of FIG. 1.

The structures shown schematically in the drawings have parts that are examples of the elements recited in the claims. The illustrated structures thus includes examples of how a person of ordinary skill in the art can make and use the claimed invention. It is described here to meet the enablement and best mode requirements of the patent statute without imposing limitations that are not recited in the claims. The words used in the claims have their full or ordinary meanings.

The present application contemplates methods, arrangements and kits for utilizing an optical enhancing arrangement with an eye-shielding device, such as, for example, a helmet or goggles.

The optical enhancing arrangement comprises an optical element and a controller for operating the optical element. The optical element comprises an electronically controlled guest-host liquid crystal cell for variably attenuating transmission of light, a controller electrically connected to the liquid crystal cell and configured to selectively supply a voltage across the liquid crystal cell, and a power source electrically connected to the controller. The optical element and controller are configured to be attached to an eye-shielding device after manufacture of the eye-shielding device.

In some embodiments, the optical element is permanently attached to the eye-shielding device.

In other embodiments, the optical element is detachably attached to the eye-shielding device.

In some embodiments, the power source is an integral part of the controller (i.e. the power source and controller are housed within one integral unit).

In other embodiments, the power source is housed within the eye-shielding device or is housed within the optical element.

In some embodiments, both the controller is housed within the optical element.

In other embodiments, the controller and power source are both housed within the optical element.

In any of the above embodiments, the controller may include a manual control device.

In some embodiments, a manual control device is provided separately for remotely activating the controller.

The power source may be a battery, a rechargeable battery, a solar cell, or a combination thereof.

In some embodiments, the controller is electrically connected to a photoreceptor.

The photoreceptor may be housed within the eye-shielding device, within the optical element, or within the controller.

Also contemplated herein is an optical enhancing arrangement comprising an optical element comprising a photochromic-dichroic cell for attenuating transmission of light. The optical element is configured to be attached to an eye-shielding device after manufacture of the eye-shielding device.

In some embodiments, the arrangement further comprises a controller electrically connected to the photochromic-dichroic cell and configured to selectively supply a voltage across the cell, and a power source electrically connected to the controller for operating the optical element.

In some embodiments, the eye-shielding device is a motorcycle helmet visor.

FIGS. 1, 2, 4, and 5 illustrate an example of an optical enhancing arrangement according to the invention. Accordingly, an optical element 10 includes a pad 15 at least partially surrounding a viewing portion 18 of the optical element 10. The pad may be formed from foam, silicon, polyurethane, or any material that can provide thermal insulation and/or can act as a moisture barrier. In some examples, vents or gaps may be provided in the pad layer, such that the pad 15 does not completely surround the optical element 10.

Figure 4:
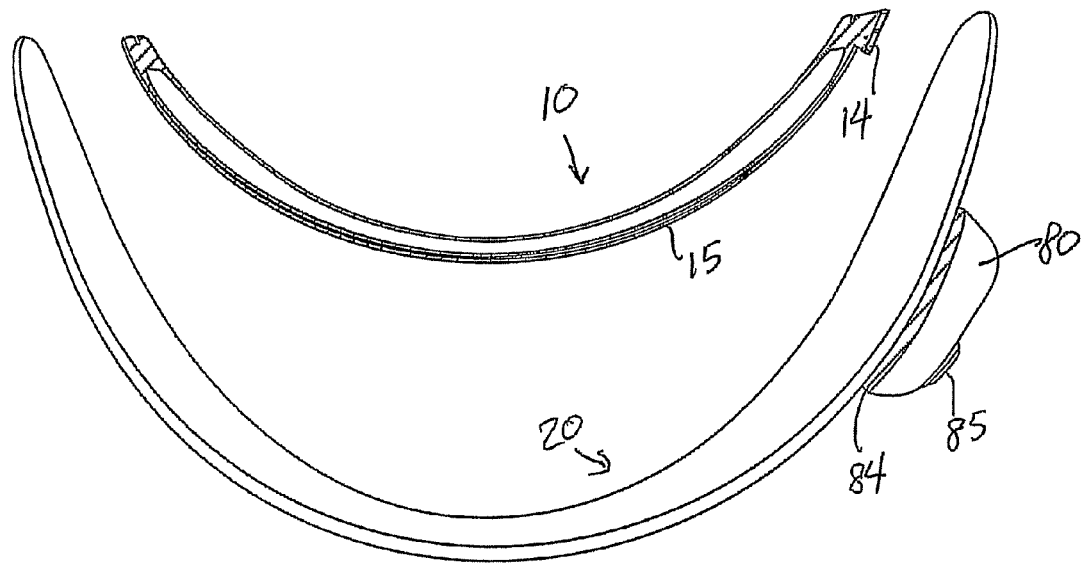
FIG. 4 is an upper perspective view of the helmet visor, optical element and controller of FIG. 1, shown with the optical element separated from the helmet visor.
Figure 5:
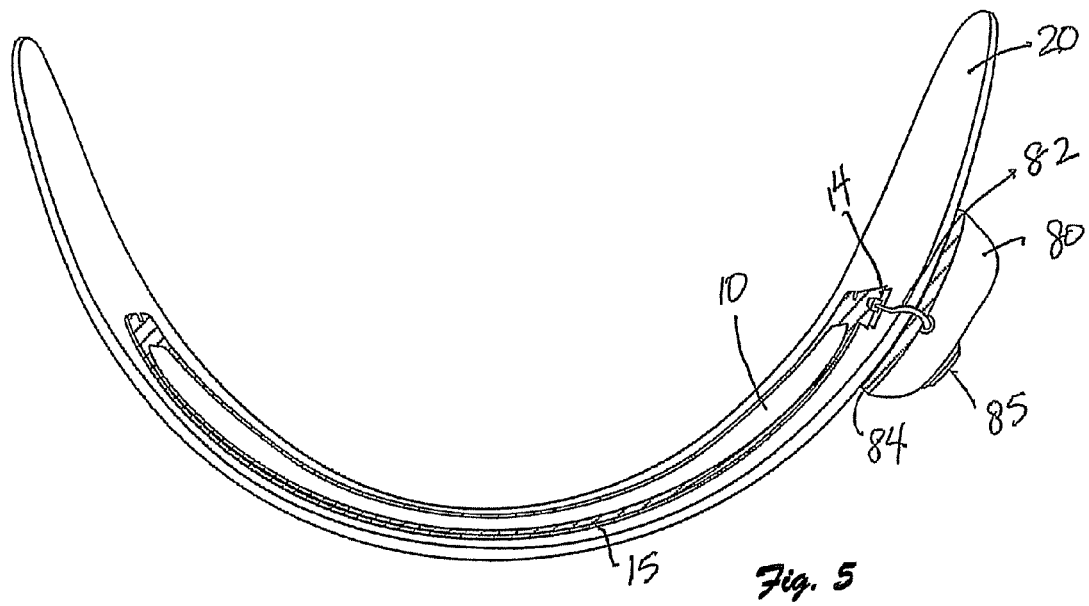
FIG. 5 is an upper perspective view of the helmet visor and optical element of FIG. 1, shown with the optical element and controller attached and abutting the helmet visor.

The optical element 10 may be attached to a surface of a viewing lens of an eye shielding device, such as, for example, to the inner surface of a helmet visor 20 after manufacture of the visor 20. The optical element 10 is connected to a controller, which itself may be attached to the viewing lens as illustrated in FIG. 5. In different embodiments, as discussed in greater detail below, the controller may be attached to the outside or inside surface of helmet visor 20 and/or may be an integral part of the optical element 10. In some embodiments, the controller may include an activating device (such as a switch, dial, etc.) located, for example, in a location on the eye-shielding device that is accessible to the end user. The controller in the example of FIGS. 1, 2, 4, and 5 is contained within a switch box 80, which has an activating button 85 for activation of the controller by the user and a power source (e.g. a battery or rechargeable battery). The switch box 80 is attached to the outside surface of the helmet visor 20. As seen in FIGS. 4 and 5, the optical element 10 is electrically connected via a flexible tab 14 (described in greater detail below) and wire 82 with the switch box 80.

Optical Characteristics of the Optical Element

In one embodiment, the optical element comprises an electronically controllable variable light-attenuating liquid crystal cell that uses a guest-host solution between two plastic substrates. The guest-host solution comprises a host material and a light-absorbing dichroic dye guest. One such liquid crystal cell is described in detail in U.S. Pat. No. 6,239,778 (Taheri et al.), the entire disclosure of which is incorporated herein by reference.

The liquid crystal cell is assembled with, or configured to be assembled with, an eye-shielding device for selectively or automatically adjusting light absorption of the device. Electrical signals delivered to the liquid crystal cell panel alter the orientation of a light attenuating dichroic dye dispersed in the liquid crystal cell, thereby altering the light attenuation or absorption of the liquid crystal cell panel.

Figure 3:
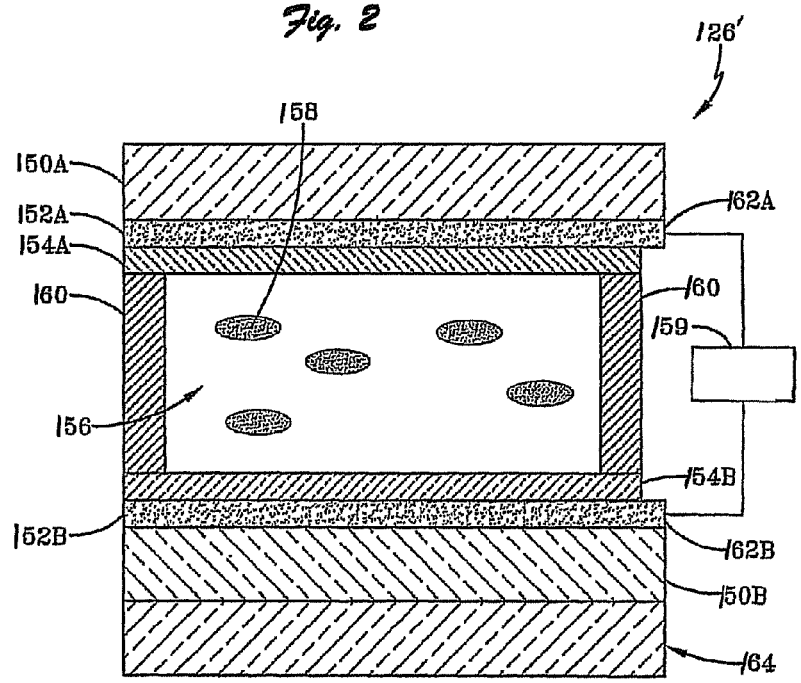
FIG. 3 is an elevational, cross-sectional schematic of a guest-host liquid crystal cell used in an optical element.

An example of a variable light-attenuating liquid crystal cell contemplated herein is presented in FIG. 3. The variable light-attenuating liquid crystal cell 126 comprises spaced apart, opposed substrates 150A and 150B, wherein each substrate provides corresponding transparent electrode layers 152A and 152B, which may be formed from indium tin oxide, conductive polymer or other appropriate conductive material. Electrode layers allow for application of a voltage across a gap between the substrates. The substrates may be flat, curved, or doubly curved. The material used for the exemplary substrates is a flexible plastic material with low birefringence. In some embodiments, one or both substrates comprise a 25 μm to 1.5 mm thick polycarbonate (PC), Polyethylene terephthalate (PET), and cellulose tri-acetate (TAC), cyclic olefin copolymer (COP), or other optical grade plastic material.

If required, an alignment layer 154 may be disposed on each electrode layer or just one of the electrode layers. The alignment layers can align the liquid crystal molecules adjacent to the alignment layers, wherein the molecules are part of the liquid crystal material received between the substrates. A gap is typically provided between the substrates and may be maintained by spacers, as is commonly known in the art. Accordingly, the opposed substrates 150 form a gap 156 which receives a mixture of a liquid crystal or other electro-optic material (such as an electro-chromic or photochromic-dichroic material-described below) and dichroic dyes.

Figure 19:
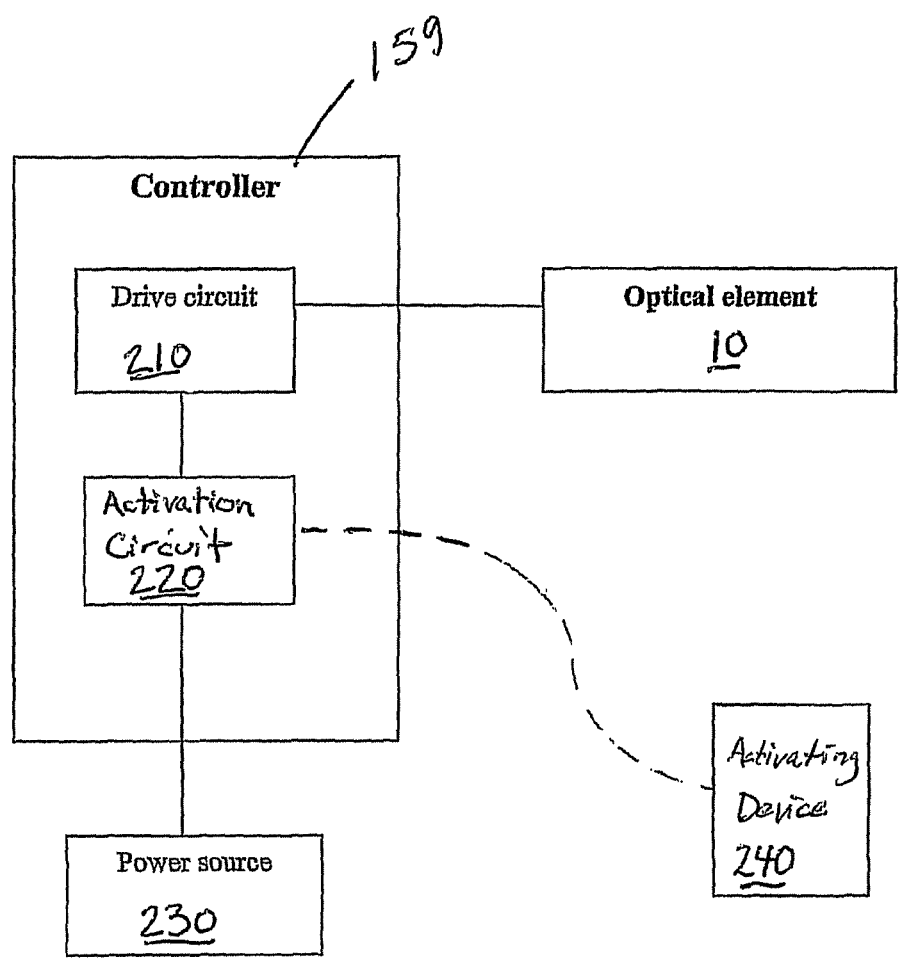
FIG. 19 is a schematic of a controller, a power source and an activating device connected to an optical element.

Each electrode layer 152A, 152B is connected to a controller 159, which, as shown schematically in FIG. 19, typically includes a drive circuit 210, a power source 230 and an activator or activation circuit 220. The control circuit applies a voltage and/or voltage waveform in in an appropriate manner to change the orientation of the liquid crystal material. By changing the orientation of the liquid crystal material, various optical properties (e.g., absorption, no absorption, high transmission, low transmission, and states in between) may be obtained. Accordingly, the variable light-attenuating liquid crystal cell described herein can change tint. For descriptive purposes, the different states of the optical element may be referred to as a "clear" state, where the optical element allows the maximum amount of light through, or a "dark" state, where the optical element allows the minimal amount of light through, or in any state between the fully clear or fully dark states. The absorption can be broad-band (i.e. absorbing across the entire visible spectrum) or across a selected band or region of the visible light spectrum. The light transmission of the optical element can range from 90% in the "clear" state, to 10% in the "dark" state, and any value in between. In some embodiments, the optical element in its clear state has a light transmission rate of 90%, 85%, 80%, 75%, 70%, 65%, 60%, 55%, or 50%. In some embodiments, the optical element in its dark state has a light transmission rate of 10%, 15%, 20%, 25%, 30%, 35%, 40%, 45%, or 50%. In a preferred embodiment, the light transmission is above 60% in the clear state and below 20% in the dark state. Additionally, the optical element may provide protection against UV light. The variable light-attenuating liquid crystal cell used in the optical element is configured so that it is "fail-safe", it reverts to the clear state when there is no voltage applied across the liquid crystals. Another noteworthy feature of the exemplary variable light-attenuating liquid crystal cell is that is does not employ polarizers.

In other embodiments, the optical element contains a photochromic-dichroic cell, containing a light-sensitive mixture comprising a fluid material and a photochromic dyestuff material, and a medium for carrying the mixture, wherein the mixture varies between a first condition and a second condition, the first condition letting substantially all light pass through the mixture, and the second condition absorbing light passing through the mixture. The mixture containing a fluid (such as a liquid crystal) material and photochromic dyestuff material is described in greater detail in U.S. Pat. No. 6,999,220 (Kosa et al.), Device Exhibiting Photo-Induced Dichroism For Adaptive Anti-Glare Vision Protection, the entire disclosure of which is incorporated herein by reference. Such a mixture will exhibit photo-induced dichroism. It has also been found that by mixing the photosensitive dyestuff material into the liquid crystal fluid material, the recovery time—the time it takes the material to revert from an absorptive (dark) state to a clear state—can be reduced from 5-15 minutes to about 2-20 seconds, which is believed to be an attribute of utilizing a fluid host.

The fluid material may be any fluid material. In one example, the fluid material is a liquid crystal material. The liquid crystal mixture may be an anisotropic liquid crystal material including, but not limited to, such materials as nematic, chiral nematic, and a polymer liquid crystal material. The mixture of the liquid crystal material and photochromic dyestuff material reacts to ultraviolet light exposure to simultaneously absorb and polarize the light. Upon removal of the ultraviolet light, the mixture reverts to its original condition within a relatively short period of time. In other words, the mixture may vary light transmission depending upon the intensity of the ultraviolet light. And the device may perform these functions passively without the need for electrical switching, or the device may perform these functions actively (electrically controlled) to precisely control the amount of absorption, or through a combination of both passive and active control.

A nematic liquid crystal material, used as the host material, further enhances the performance of the optical element. Moreover, it is possible that the nematic liquid crystal material may itself have photochromic properties. With a liquid crystal material, the optical element, in the absence of a bright ultraviolet light, is essentially transparent to light, regardless of its state of polarization. However, when the optical element is irradiated with a bright activating or ultraviolet light, as is found in sunlight, it preferentially absorbs at least one polarization component of visible light to substantially reduce the glare that impedes clear vision while also absorbing a portion of the light. Upon removal of the ultraviolet light, the optical element reverts to its transparent state. As such, the optical element performs both an anti-glare function and an absorption function. Most importantly, this anti-glare function is performed only in a bright environment when glare presents a problem. This function is passive, inasmuch as no stimulus other than naturally occurring sunlight causes a change in the device's condition between transparent and absorptive.

In one example, the mixture may be carried by a polymeric film. As such, the optical element may incorporate the mixture into a polymeric material using thermal-, solvent-, or polymerization-induced phase separation. Alternatively, the mixture may include a polymer liquid crystal with embedded photochromic dyestuff material which is then polymerized by known methods. This functions to "lock-in" the dye orientation and attain the desired features of the invention.

Thus, one embodiment of the optical element of the present invention includes a fluid material and a photochromic dyestuff material which exhibits dichroism into a mixture; where the mixture is carried in a medium. In such an arrangement, the mixture varies between a first condition and a second condition, the second condition absorbing and polarizing light upon exposure to any wavelength of ultraviolet light and the mixture relaxing to said first condition, which lets all visible light pass through the mixture, when exposure to any wavelength of ultraviolet light is removed.

By applying an electric field to such an optical element, the variation between the first and second conditions may be controlled manually, or automatically, even in the presence of any wavelength of ultraviolet light. generating said electric field, even in the presence of any wavelength of ultraviolet light, to control the orientation of said photochromic dyestuff material. In one example, by generating such an electric field, even in the presence of any wavelength of ultraviolet light, the mixture can be forced back toward its first condition. In another example, by generating an electric field, even in the presence of any wavelength of ultraviolet light, the mixture can be forced toward its second condition by preferentially absorbing a polarization component. In yet another example, by generating an electric field, even in the presence of any wavelength of ultraviolet light, the mixture can be forced toward its second condition to absorb visible light, but not any polarization component.

Returning to FIG. 3, an edge seal 160 is provided around or about the outer periphery of the liquid crystal or dichroic-photochromic cell 126 so as to retain the liquid crystal-dye mixture material between the substrates. Such variable light-attenuating liquid crystal cells are described in greater detail in U.S. Pat. Nos. 6,239,778, 6,690,495, and 7,102,602, and in co-pending U.S. Application Pub. No. 2008/0013000, the entire disclosures of which are incorporated herein by reference.

It is to be understood that a variety of optical elements may be assembled with viewing lenses of a variety of eye-shielding or light transmitting devices using one or more of the inventive features described in the present application. For example, such inventive features may be used with the viewing lenses of devices such as protective or vision enhancing goggles or glasses or other protective eyewear, such as helmet visors.

According to one aspect of the present application, an optical element is configured to be secured to an eye-shielding device. In other embodiments, an optical element may be provided in an "after-market" kit for assembly with the viewing area of a pre-assembled eye-shielding device (such as a helmet) by a person other than the original manufacturer of the helmet, such as a retailer or end user. The optical elements described herein are secured to inner surfaces of the helmet visors for better protection of the optical element from impact, debris, moisture, and other hazards and contaminants.

According to one aspect of the present application, a variety of methods and mechanisms are described for permanently or removably securing an optical element to a viewing lens of a device. According to another inventive aspect of the present application, a variety of methods and mechanisms are described for automatic or user control of the tint or light-absorption of the optical element, and for associating such a control mechanism with the optical element as well as the device to which the optical element is to be secured.

Also provided are methods of altering the light absorption or transmission properties of the viewing area of an eye-shielding device using an optical enhancing arrangement described herein.

Attachment of the Optical Element to the Visor

Several different arrangements and mechanisms may be utilized to permanently or detachably secure an optical element to an eye-shielding device, including mechanical, chemical adhesive, chemical/mechanical combinations, magnetic, friction grip, mechanical hook and loop (e.g., VEL-CRO®), or a combination thereof.

The term "detachably attached" is defined as an attachment that nevertheless enables the end user to remove the optical element if desired. Accordingly, an optical element that is detachably attached may be removed by the end user without causing damage to the eye-shielding device (e.g., the helmet visor). In contrast, "permanently attached" optical elements are not meant to be removed by the end user once they have been attached because such removal may cause damage to the eye-shielding device or the optical element.

The optical element may be attached using a chemical adhesive. In one embodiment, an adhesive may be provided on a portion of an optical element, such that a user may selectively attach the optical element to the inner surface of the helmet visor in a desired location.

In one example, illustrated in FIGS. 1, 2, 4, and 5, the pad 15 is provided with an adhesive 11 for securing the pad 15 to the helmet visor 20. The adhesive 11 may be a permanent adhesive (e.g., a double sided or pressure sensitive adhesive) for permanently securing the optical element 10 to the visor 20. Alternatively, the adhesive 11 may be a releasable adhesive to allow for removal, replacement, and/or repositioning of the optical element 10 on the helmet visor 20 or onto another visor or device.

In some embodiments, an adhesive (such as a pressure sensitive, UV curable, or other adhesive) may be provided on a portion of, or the entire, surface of the optical element 10 which abuts the inside surface of the helmet visor. In this arrangement, there may be no need to provide a pad 15 around the periphery of the optical element.

Other mechanisms for permanently or detachably attaching an optical element to a helmet visor include mechanical means. Accordingly, in one example, clamps or clips may be used to secure an outer periphery of the optical element to the eye-shielding device. Other examples of mechanical type attachments for detachably attaching the optical element are provided in FIGS. 6-18.

Figure 6:
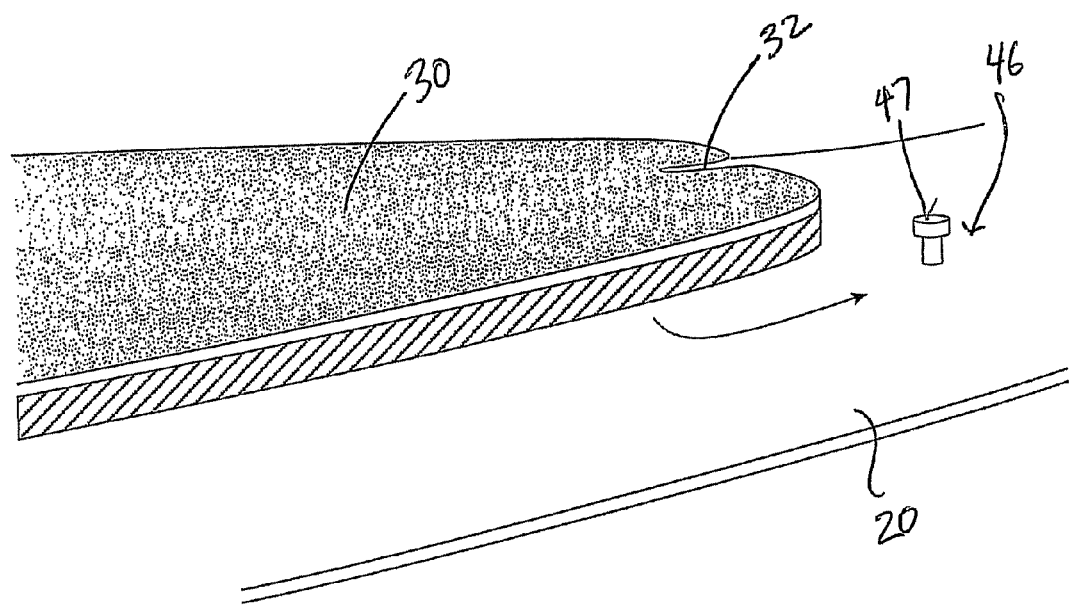
FIG. 6 is a partial upper perspective view of an optical element and helmet visor, shown in a detached condition.
Figure 7:
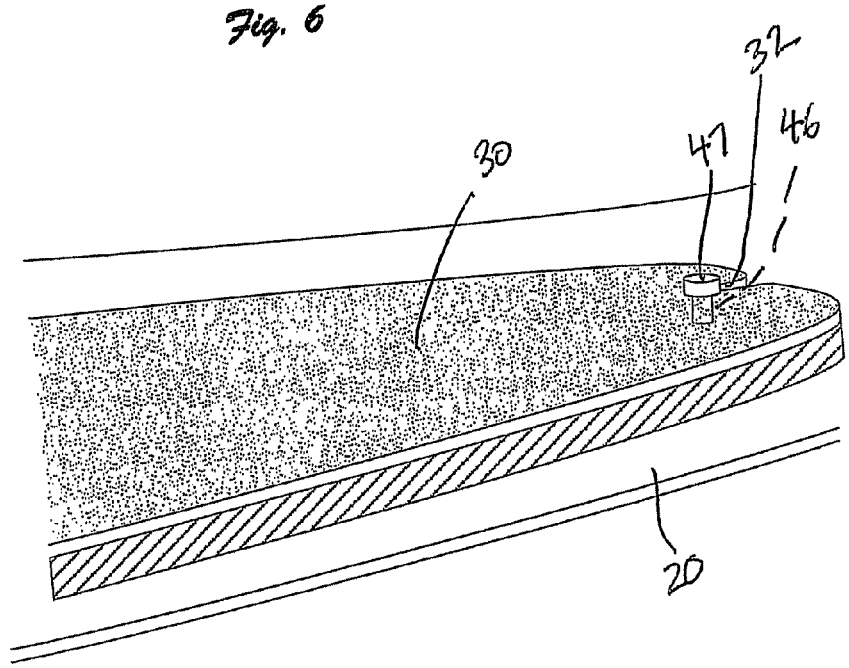
FIG. 7 is a partial upper perspective view of the optical element and helmet visor of FIG. 6, shown in an attached condition.
Figure 8:
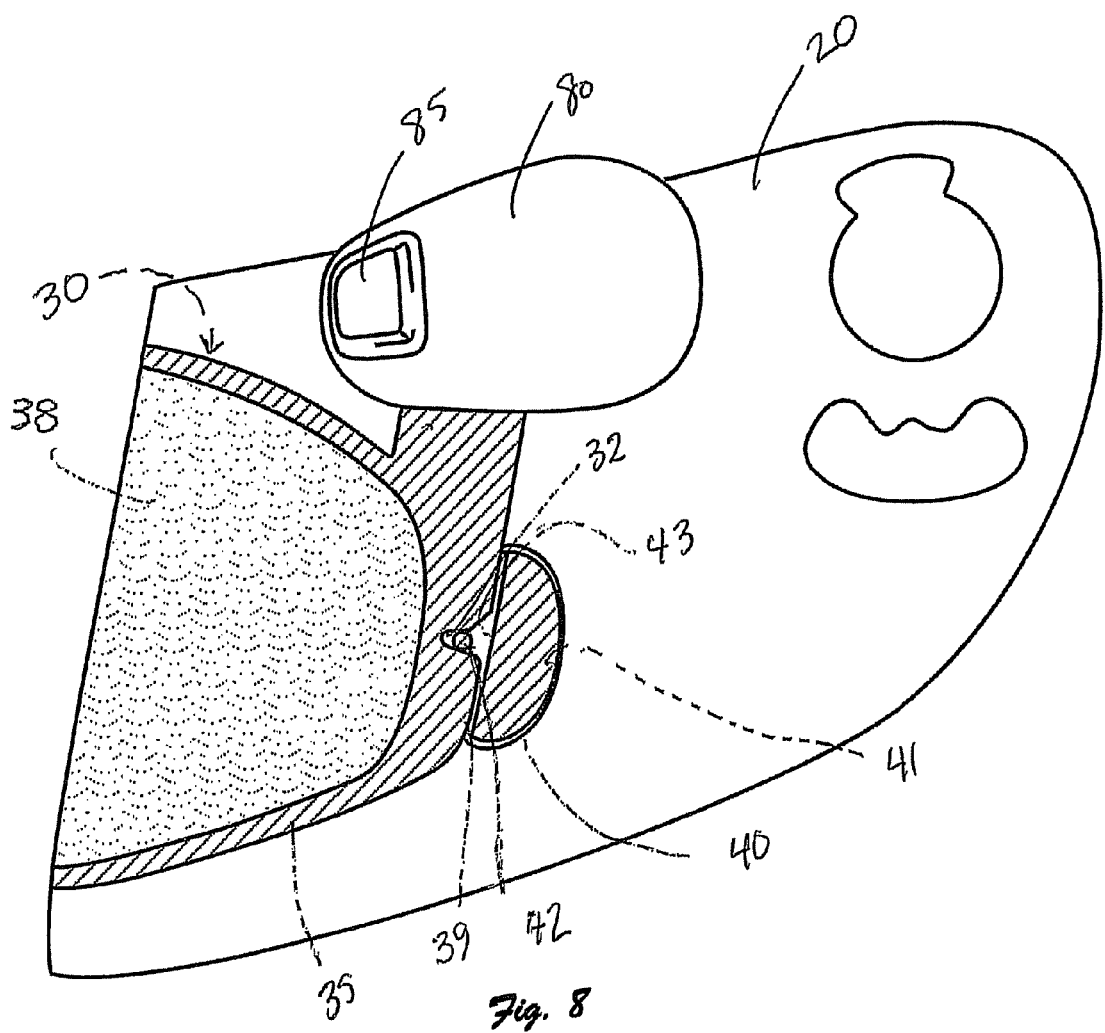
FIG. 8 is a side elevational view of a helmet visor with an electronically operable optical element mounted in an anchored pin arrangement and a controller attached to the upper edge of the outside surface of the visor.
Figure 9:
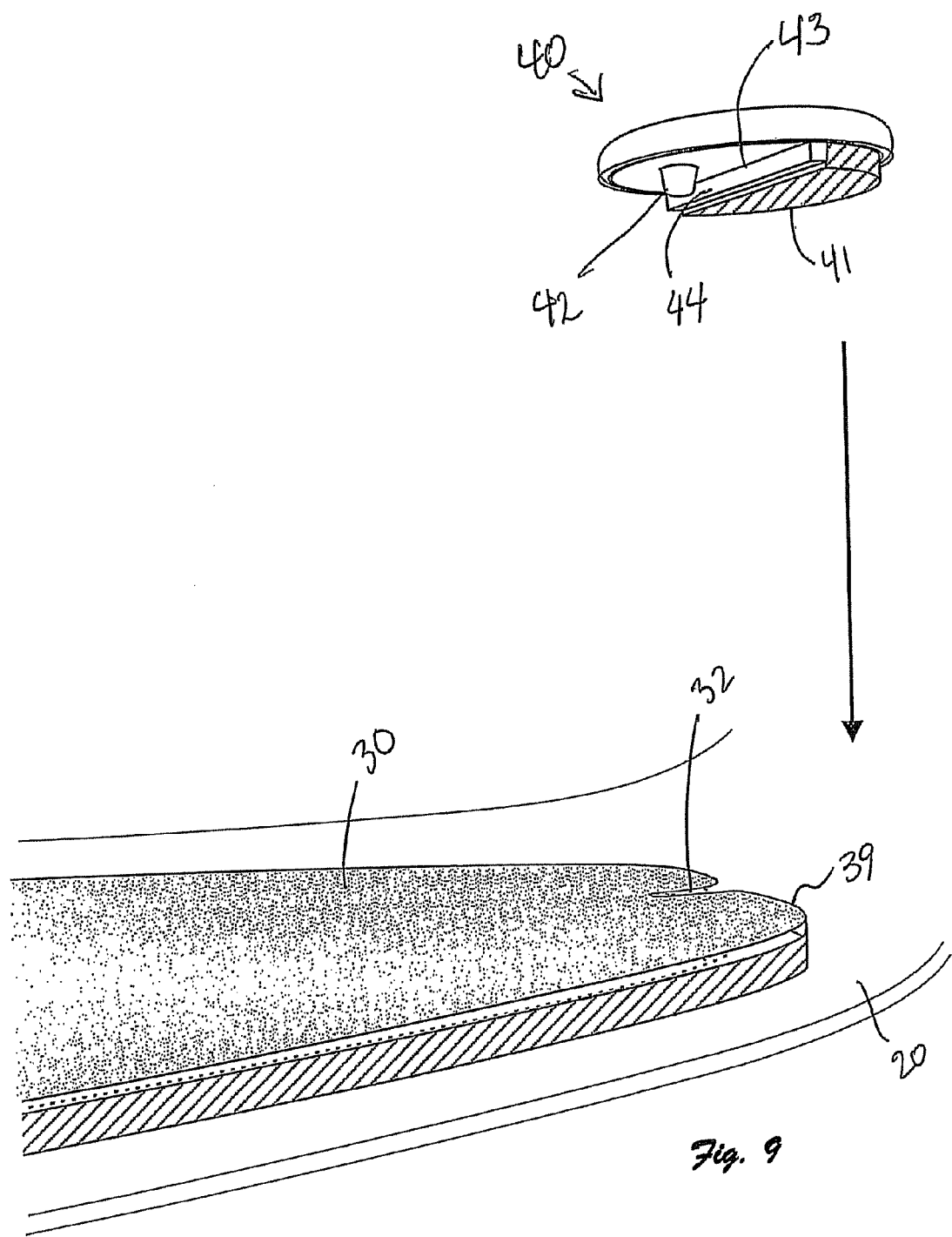
FIG. 9 is a partial upper perspective view of the helmet visor and optical element of FIG. 8, shown with the optical element loosely abutting the helmet visor and a separated anchor member for securing the optical element to the helmet visor.
Figure 10:
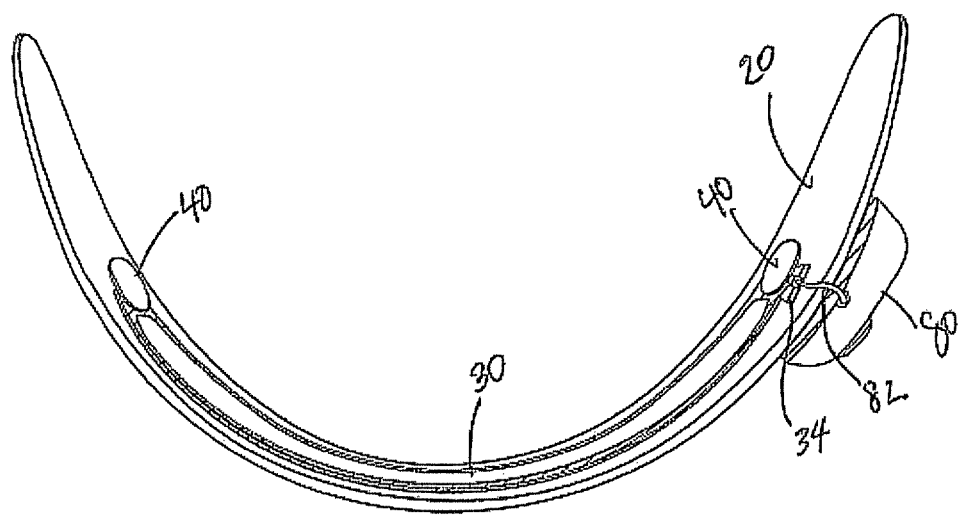
FIG. 10 is an upper perspective view of the helmet visor and optical element of FIG. 8, shown with the optical element secure to the inside surface of the helmet visor and a controller attached to the outside surface of the helmet visor and electrically connected to the optical element.
Figure 11:
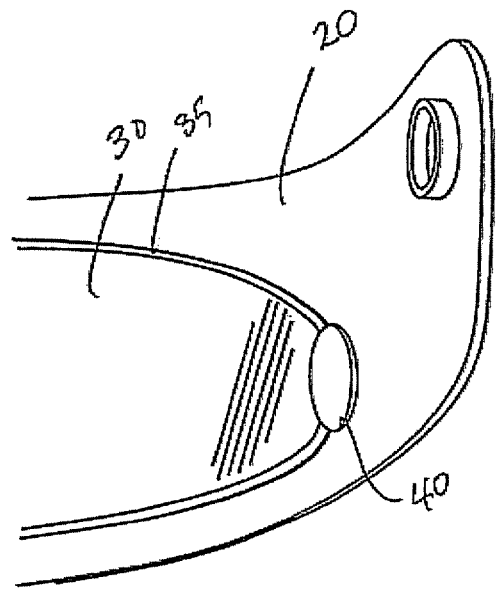
FIG. 11 is a partial rear elevational view of the helmet visor and optical element of FIG. 8, shown with the optical element secured to the helmet visor by the anchor member.

In one embodiment, a visor may be provided with two or more staked pins or rivets fitted through holes in the helmet visor and positioned to engage corresponding notches in an outer periphery of the optical element. As illustrated in FIGS. 6 and 7, a pin 46 extending from an inner surface of a helmet visor 20 is positioned to interlock with a peripheral notch 32 in the optical element 30. The pin 46 may include an enlarged head portion 47 to restrict separation of the optical element 30 from the visor 20 while the pin 46 is received in the notch 32. During installation, the optical element may be flexed to interlock the notches 32 with the pins 46. When the optical element 30 is released from the flexed condition, the optical element is retained on the helmet visor by this interlocking engagement of the pins 46 and notches 32. One example of such a staked pin attachment arrangement is described in U.S. Pat. No. 5,765,235, the entire disclosure of which is incorporated herein by reference, to the extent that it is not conflicting with the present application.

In other embodiments, a combination of chemical and mechanical means may be used for detachably attaching the optical element to the eye-shielding device. For example, an interlocking pin (i.e., for interlocking with a notch in an optical element) may be applied to a helmet visor without cutting holes in the helmet visor. In one example, shown in FIGS. 8-12, an interlocking pin is provided on an anchor member whereby the anchor member is adhesively attached to a helmet visor. The anchor member provides greater contact area between the anchor member and the helmet visor to facilitate a stronger bond between the anchor member and the visor. In the illustrated embodiment of FIGS. 8-12, anchor members 40 include adhesive pads 41 (see FIG. 9) for securing to the helmet visor 20. Interlocking pins 42 extend from undercuts 43 in the anchor members 40 to extend toward the helmet visor surface when the anchor members 40 are secured to the helmet visor 20. The pins 42 may, but need not, engage the helmet visor surface and may, but need not, include an adhesive to secure the ends of the pins 42 to the helmet visor 20. The pads 41 and/or undercuts 43 may define edges 44 that engage corresponding peripheral edges 39 of the optical element 30 to reduce stresses on the pins 42.

Figure 12:
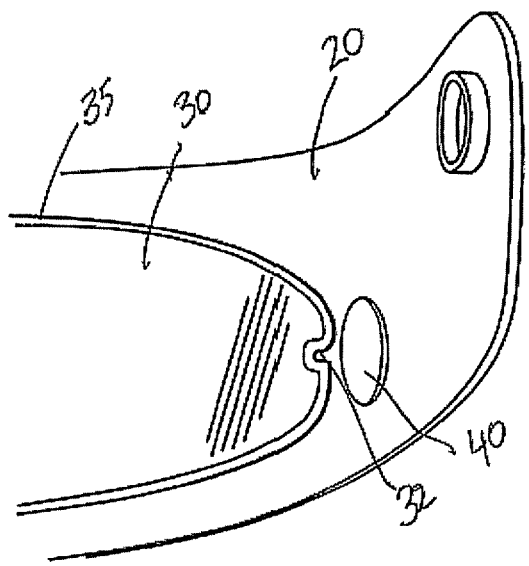
FIG. 12 is a partial rear elevational view of the helmet visor and optical element of FIG. 8, shown with the optical element separated from the anchor member.

When initially attaching the optical element 30 to the helmet visor 20, the anchor members 40 may be secured to the helmet visor 20 by adhering the pads 41 to the inner surface of the helmet visor 20. Subsequently, the optical element 30 is placed against the visor 20 so that the pins 42 are received in corresponding notches 32 in the optical element 30 (FIGS. 8-12). To detach the optical element 30 from the helmet visor 20, the optical element 30 and/or the helmet visor 20 may be flexed to disengage the pins 42 from the corresponding notches 32 (FIG. 12). To subsequently re-attach the optical element 30 to the helmet visor 20, the optical element 30 and/or the helmet visor 20 may be flexed to again receive the pins 42 in the corresponding notches 32. In still another embodiment (not shown), all or part of the anchor members may be flexed or pivoted to disengage interlocking pins from corresponding notches of the optical element.

In other embodiments, retaining flanges may be used for permanently or detachably securing an optical element to an eye-shielding device. As one example, a retaining flange may be secured to a helmet visor, the flange being sized to at least partially surround and overlap a peripheral edge of the optical element to secure the optical element to the helmet visor. Such an arrangement can be used for either permanent or detachable attachment of the optical element 10 to the visor 20.

Figure 13:
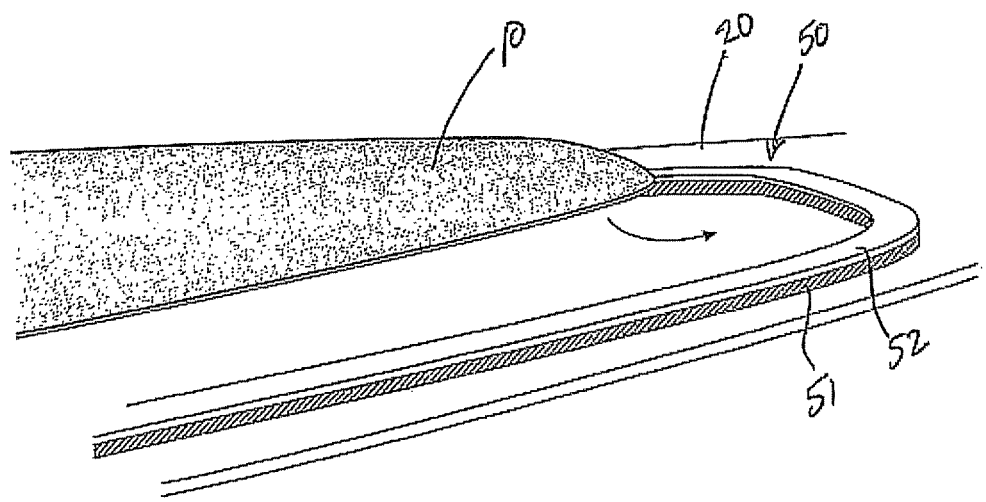
FIG. 13 is a partial upper perspective view of an optical element and a helmet visor with a peripheral retaining flange mounting arrangement, shown with the optical element separated from the helmet visor.
Figure 14:
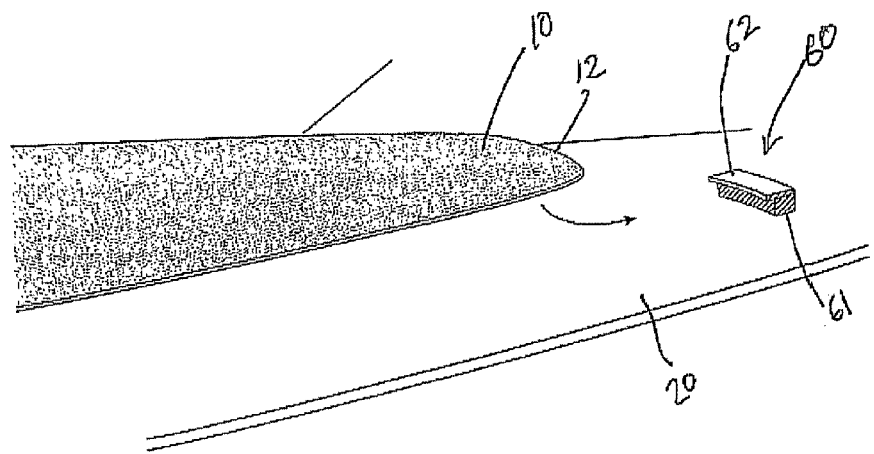
FIG. 14 is a partial upper perspective view of an optical element and a helmet visor with a side retaining flange mounting arrangement, shown with the optical element separated from the helmet visor.
Figure 15:
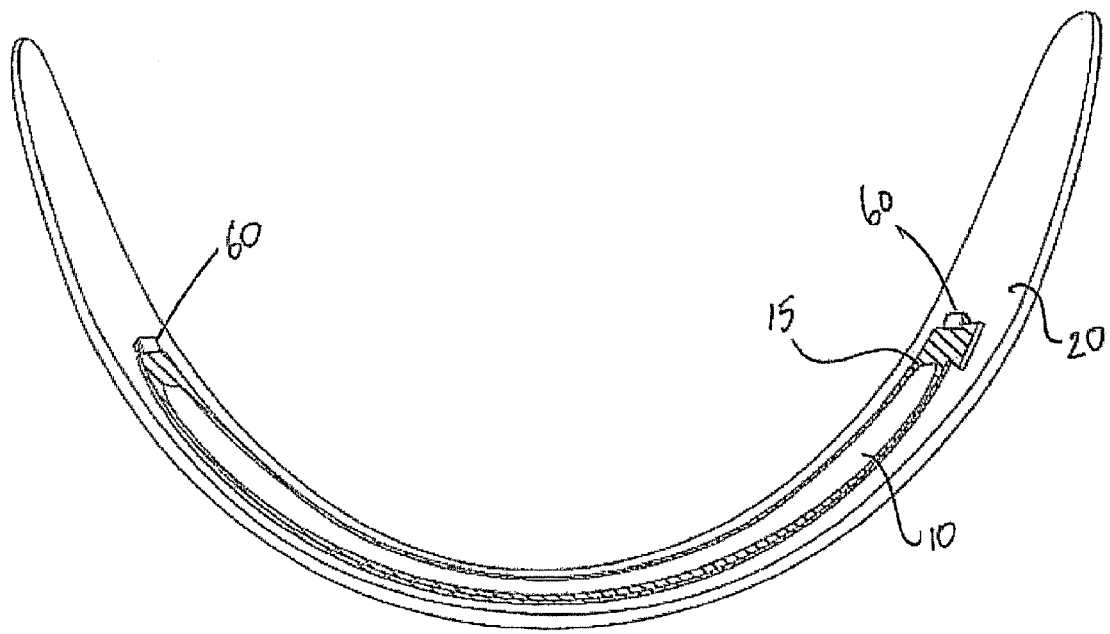
FIG. 15 is an upper perspective view of the optical element and helmet visor of FIG. 14, shown with the optical element secured to the helmet visor.
Figure 16:
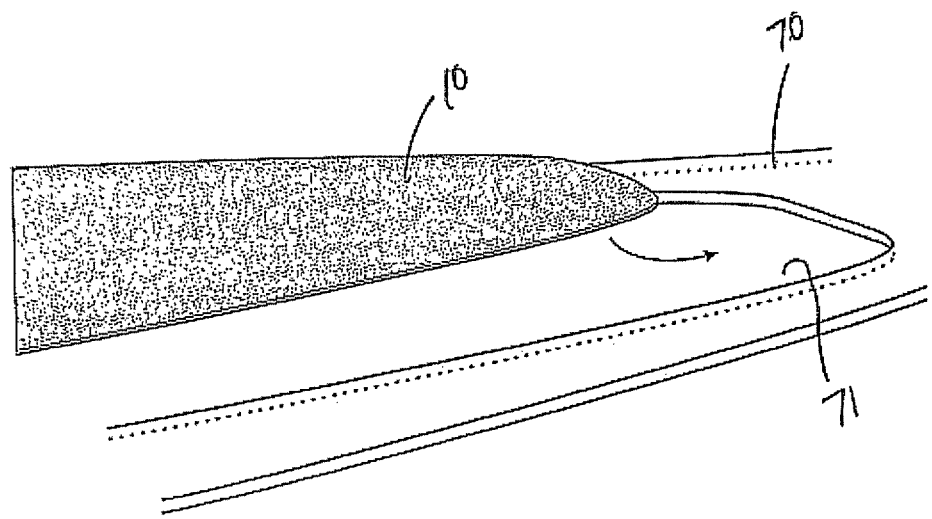
FIG. 16 is a partial upper perspective view of an optical element and a helmet visor with a recess for retaining the optical element, shown with the optical element separated from the helmet visor.
Figure 17:
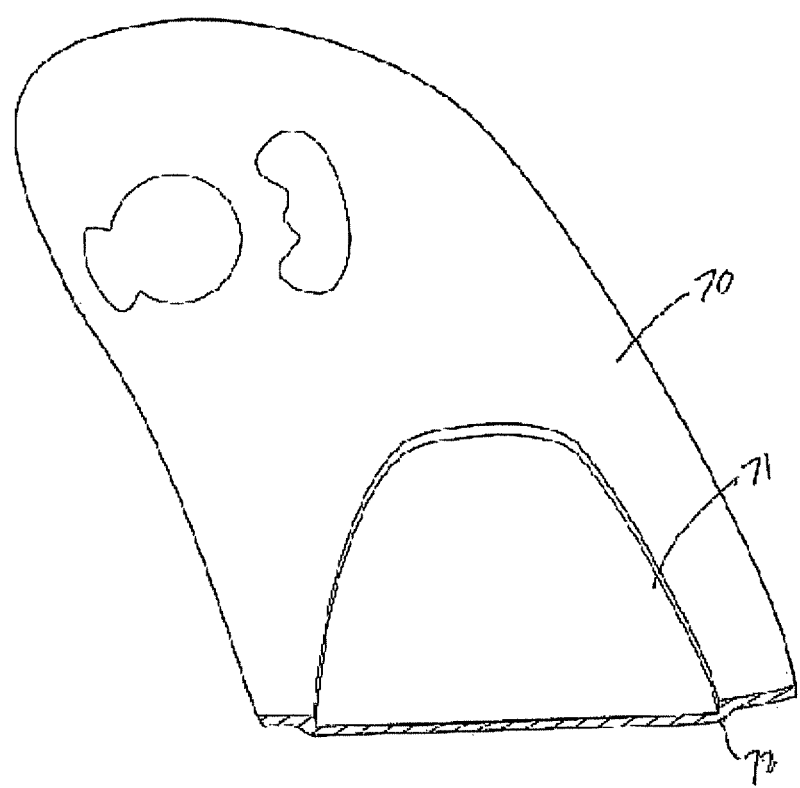
FIG. 17 is a cross-sectional view of the helmet visor of FIG. 16.
Figure 18:
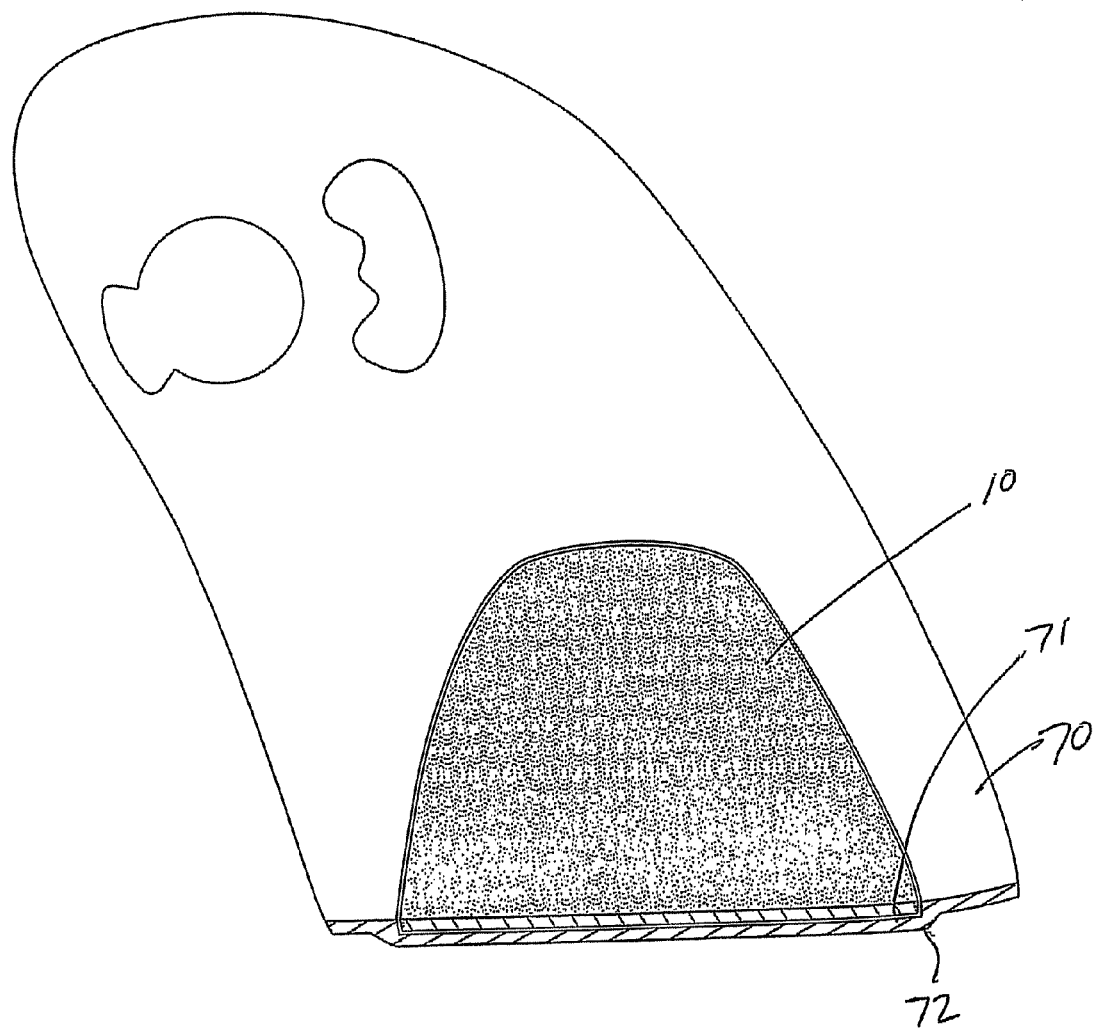
FIG. 18 is a cross-sectional view of the helmet visor and optical element of FIG. 16, shown with the optical element assembled with the helmet visor.

One example of such an arrangement is shown in FIG. 13. A retaining flange 50 includes an insulator or pad 51 secured to a rigid rim 52 to form a channel for receiving the optical element 10 when the insulator 51 is secured to the visor 20. As shown, the retaining flange 50 may completely surround the optical element 10. In another embodiment, a plurality of retaining flanges may partially surround the optical element. In this arrangement, the visor and/or optical element may be flexed to disengage the peripheral edges of the optical element from the retaining flanges. For example, as shown in FIG. 14, opposed side retaining flanges 60 (including adhesive pads 61 and rigid rims 62) may surround and overlap side portions 12 of the optical element 10 to secure the optical element 10 to the visor 20 while allowing the optical element 10 to be detached from the visor by flexing one or both of the optical element 10 and the visor 20. In still another embodiment, the retaining flanges may be flexed or pivoted to release the optical element.

Other mechanisms for detachably attaching the optical element include one or more magnets that may be secured to a portion or portions of one of the optical element and eye-shielding device to magnetically attach to magnetized portions of the other of the optical element and device.

In other embodiments, hook and loop type fasteners (e.g., VELCRO® strips) may be utilized on the optical element and the eye-shielding device.

In still other embodiments, an eye-shielding device may be modified or adapted to receive and retain an optical element using pressure or friction. In one example of such an embodiment, illustrated in FIGS. 16-18, a helmet visor is provided with a recess sized to closely receive an optical element. While an adhesive or other fasteners may be used to secure the optical element within the recess, in some embodiments, the shape or contour of the optical element and helmet visor may be matched in such a way as to retain the optical element without the need for any other fasteners. In the example shown in FIGS. 16-18, a helmet visor 70 includes a recess 71 on an inner surface of the visor 70 sized to closely receive an optical element 10. As shown, the visor 70 may, but need not, include a raised portion 72 on an outer surface of the visor 70 aligned with the recess 71 to provide increased thickness (e.g., for increased strength or rigidity) in this portion of the visor 70. To facilitate retention of the optical element 10, the contour of the optical element 10 may vary from that of the visor 70, such that the optical element is flexed when received in the recess 71, thereby retaining the optical element 10 in the recess 71 by pressure. Additionally or alternatively, an interference fit between the optical element 10 and the recess 71 may be utilized. Further, the recess 71 may be sized such that an inner surface of the optical element 10 is substantially flush with the inner surface of the helmet visor 70.

Electrical Connections

Because the optical element is electronically controlled, connection of the optical element to a controller and connection of the controller to the eye-shielding device is also required. The controller 159 comprises a drive circuit 210 and an activator or activation circuit 220 for activating the drive circuit (as shown schematically in FIG. 19). Additionally, the controller 159 may include, or be connected with, a power source 230 (e.g., a battery cell or solar cell), and/or an activating device 240 (such as a switch) for manually controlling the amount of voltage applied to the optical element. In other embodiments, the activating device may be configured for automatically controlling the amount of voltage applied to the optical element. In one such embodiment, an automatic activating device includes a photoreceptor configured to provide a voltage proportional to the amount of light impinging on the photoreceptor. In addition (not shown), the controller may be provided with a power or "master" switch to enable or disable operability of the activation circuit, for example, to prevent inadvertent activation of the optical element (and resulting battery drain) when the optical element is not in use.

Figure 25:
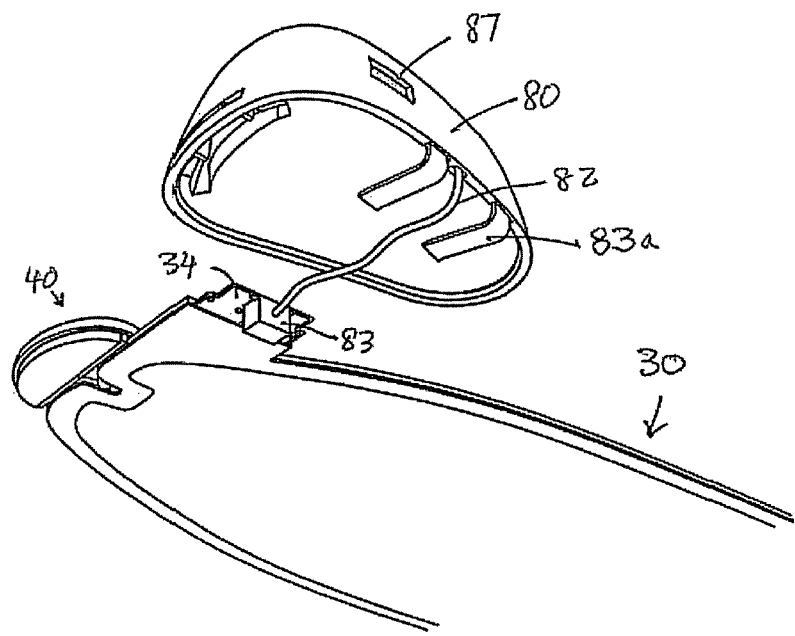
FIG. 25 is a partial rear perspective view of an optical element electrically connected with a controller, the controller being secured to the helmet visor by a clip arrangement.

The power source may be rechargeable and/or readily replaceable to allow for minimization of the power source size. As shown, for example, in FIG. 25, a controller 80 with integral power source, may be provided with an electrical port 87 (e.g., a USB port) to charge the power source by connecting the controller 80 to an external power source (e.g., a wall socket), without disconnecting or removing the power source from the controller. The power source, drive circuit and activation circuit may form a separate entity or structure electrically connected to the optical element by means well known in the art such as wire, flex board, via, or other comparable means. In other embodiments, the controller (with or without a power source) may form an integral part of the optical element.

In some embodiments, the power source, drive circuit, activation circuit and activating device form one integral unit, as shown, for example, in FIGS. 1, 5, 24, and 25. In these examples, electrically conductive tabs 14, 34 of an optical element 10, 30, as described above, are electrically connected by a wired connection 82 with a user operable controller 80 for selective control of the tint or light absorption setting of the optical element 10, 30. While the exemplary controller 80 includes a button 85 as the activating device for selective activation or deactivation ("on/off") of the optical element 10, 30, the controller may be configured to provide for varying levels of light absorption by the optical element, for example, by gradually changing the tint of the optical element. For example, adjustment of the tint of the optical element may be effected by varying the voltage across the liquid crystal material. Additionally or alternatively, other activation mechanisms may be utilized, such as, for example, one or more switches, momentary switches, knobs, dials, proximity switches, touch pad sensors or other devices known in the art.

Figure 20:
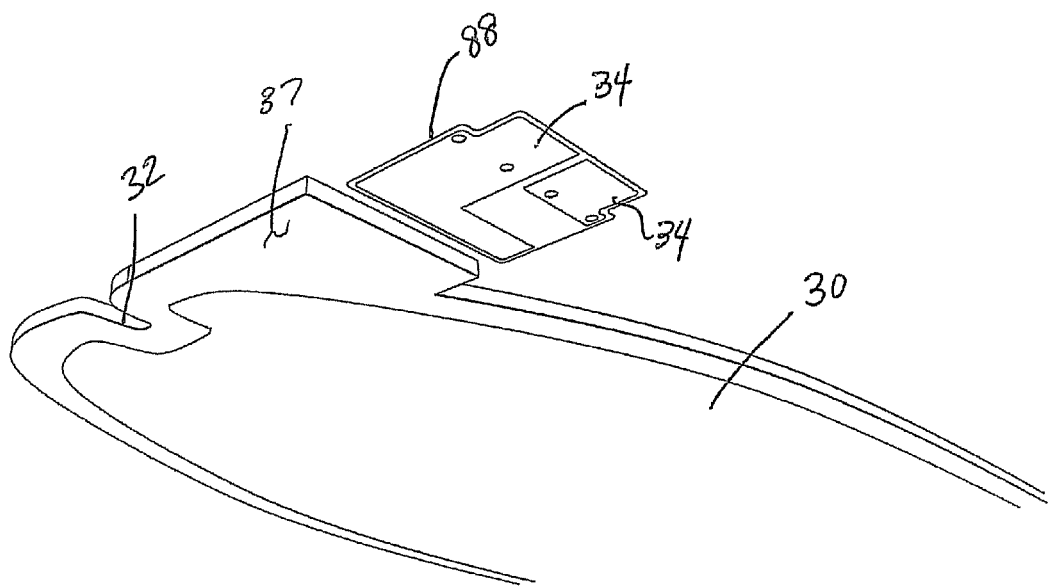
FIGS. 20 and 21 are partial rear perspective views of an electronically operable optical element, shown with an electrically conductive tab portion disassembled from the optical element.
Figure 21:
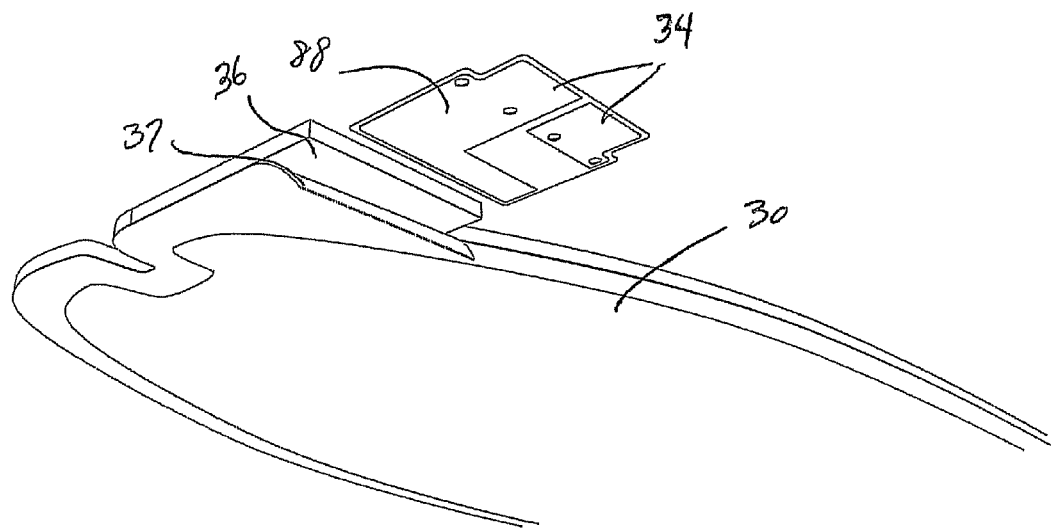
Figure 22:
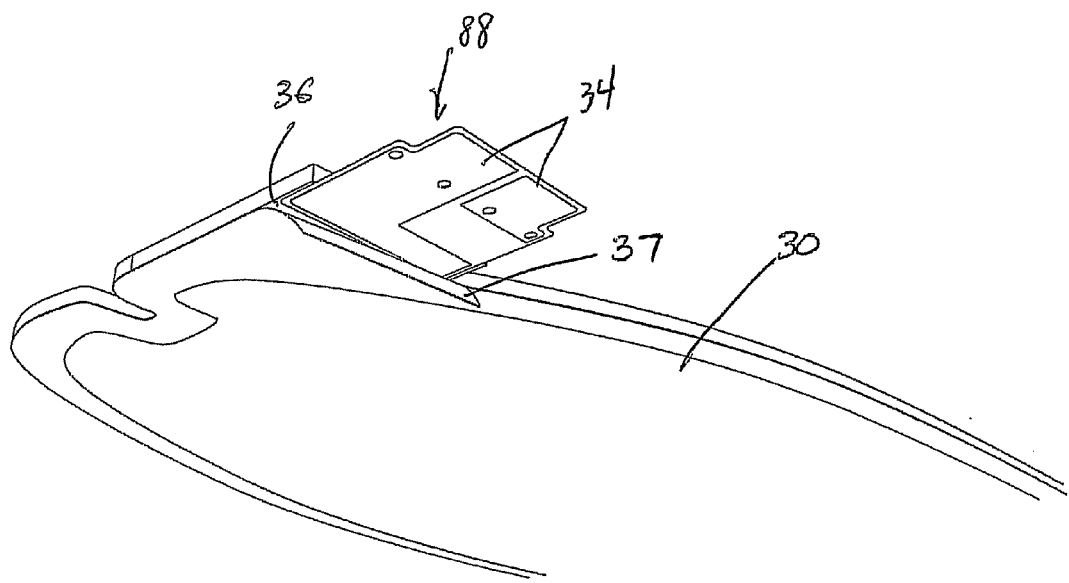
FIGS. 22 and 23 are partial rear perspective views of the electronically operable optical element of FIGS. 20 and 21, shown with the electrically conductive tab portion assembled with the optical assembly.
Figure 23:
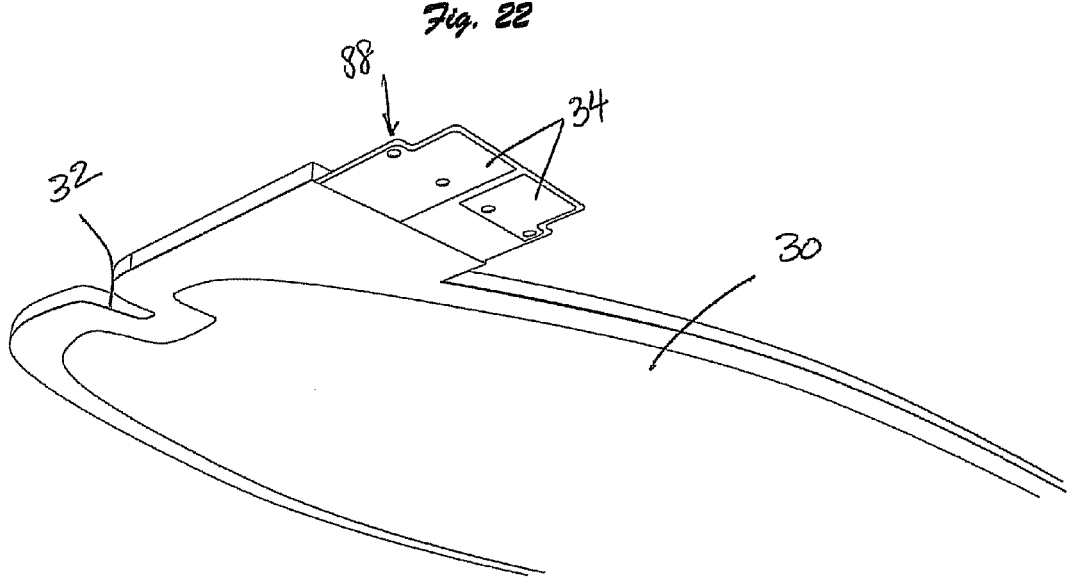

While many different electrical connections may be provided between the optical element and the power source and/or controller, in one embodiment, the optical element and solar cell are connected by an electrical interconnection tab 88, most clearly shown in FIGS. 20 and 21, formed from pairs of conductive electrode pads 34 separated by a non-conductive insulator panel. The separated electrode pads 34 may be electrically connected by aligned holes 39 in the electrode pads and insulator panel that are coated with a conductive material. A conductive adhesive may be applied to the electrode pads to secure the opposed electrode pads to the optical element and to the solar cell. The interconnection tab may be thin enough to be inserted between the electrode layers of the optical element 30. One such embodiment of an interconnection tab is described in co-pending U.S. Patent Application Pub. No. 2009/0201461, entitled INTERCONNECTION TAB USED WITH OPTICAL DEVICES, the entire disclosure of which is incorporated herein by reference.

While the wired connection 82 between the optical element 10, 30 and the controller 80 may be a permanent connection, in other embodiments, a plug and socket or other disconnectable arrangement may be utilized, for example, to facilitate replacement of only one of the optical element 10, 30 and the controller 80, or to enable storage as separate components. In still other embodiments (e.g. FIG. 26), a controller may be connected the optical element, with leads on the drive circuit connected directly to the conductive tabs of the optical element. This may also facilitate attachment of the controller to the eye-shielding device.

Figure 5A:
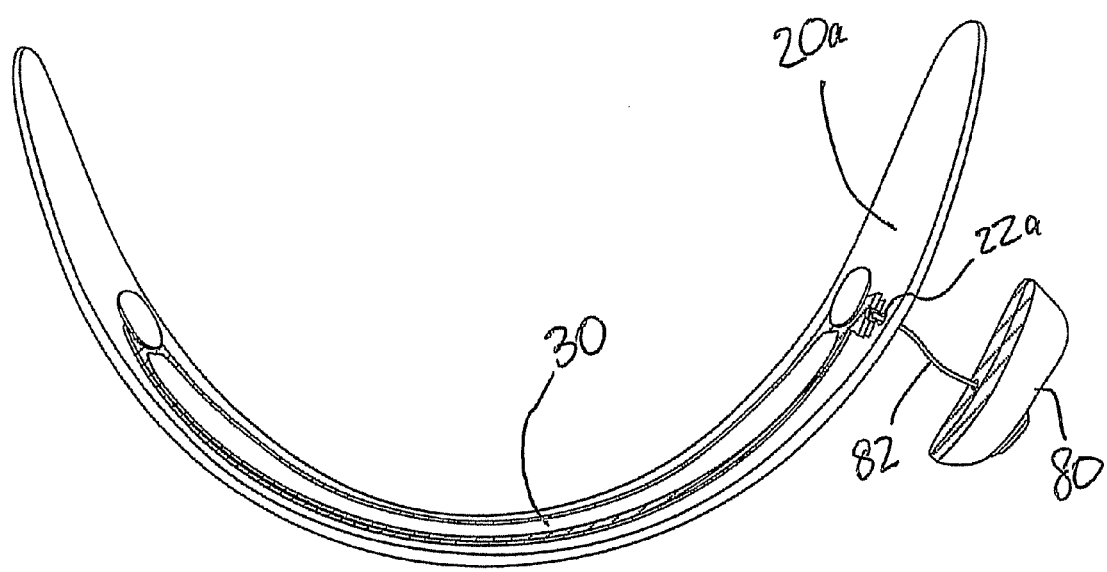
FIG. 5A is an upper perspective view of a helmet visor with an optical element electrically connected with a controller by a wired connection extending through an opening in the visor.

To facilitate retrofitting to an existing helmet visor, the wired connection 82 may be extended over an outer edge (e.g., an upper or lower edge) of the visor 20 to connect with the controller 80 secured to an outer or inner surface of the visor 20, as shown in FIG. 5. In another embodiment, the visor may be configured to permit connection between the optical element and the controller through the visor. As one example, a visor may be provided with an aperture (either provided by the manufacture or drilled as part of aftermarket assembly) positioned to permit a wired connection from the optical element to be threaded through the aperture for connection to a controller. In the illustrated embodiment of FIG. 5A, the visor 20a includes an aperture 22a through which wired connection 82 extends from an optical element 30 for connection with the controller 80. The aperture 22a may be positioned to minimize the amount of wiring required, and to minimize the amount of wiring exposed on the inner and outer surfaces of the visor 20a.

In other embodiments, one or more of the activating device and the power source may be separate from the drive circuit, for example, to reduce the size of the controller or to allow for remote activation. In one example, a drive circuit is electrically connected with a power source stored within or integral to the eye-shielding device (as shown, for example, in FIG. 29). In another example (not shown), the controller is activated wirelessly by a remote control device.

Figure 24:
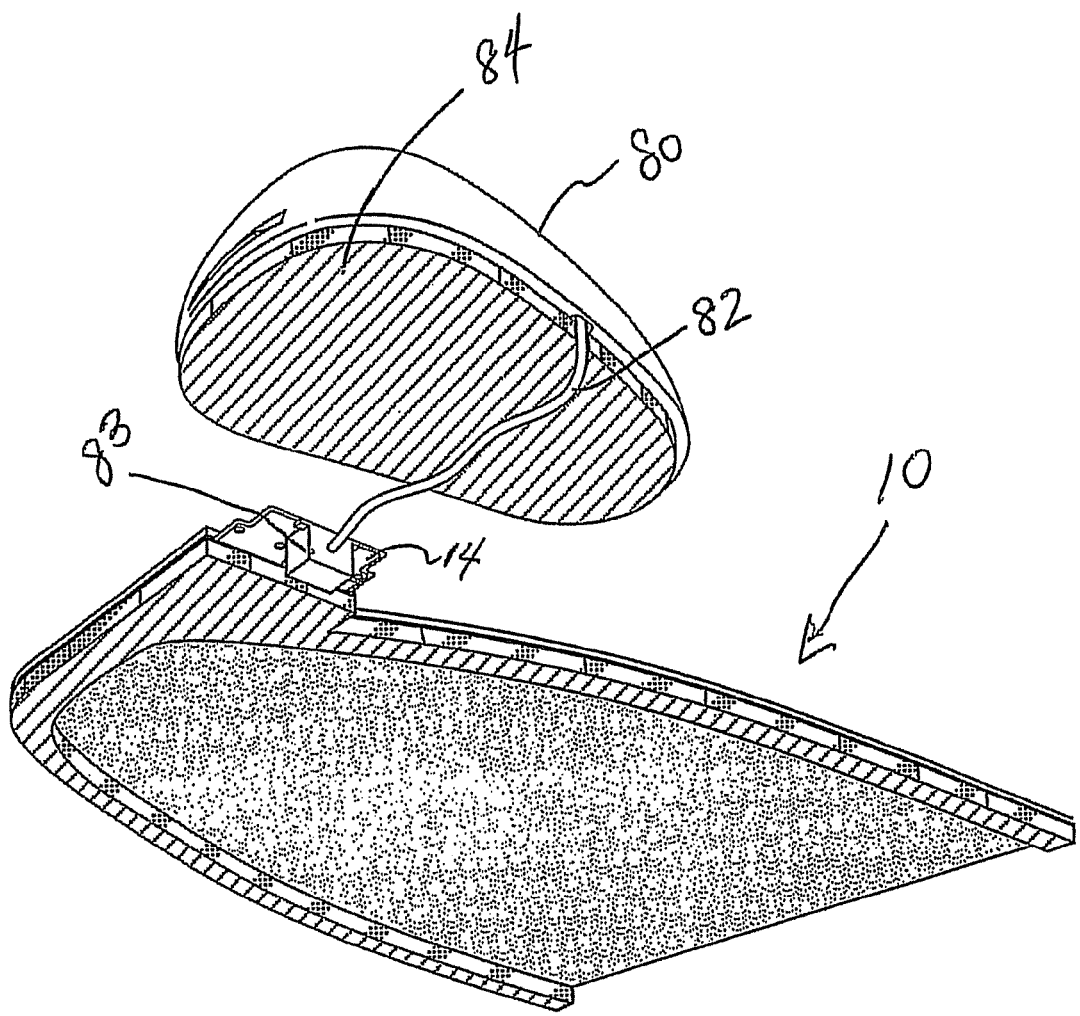
FIG. 24 is a partial rear perspective view of the optical element of FIGS. 1-2 electrically connected with a controller by a wired connection.
Figure 26:
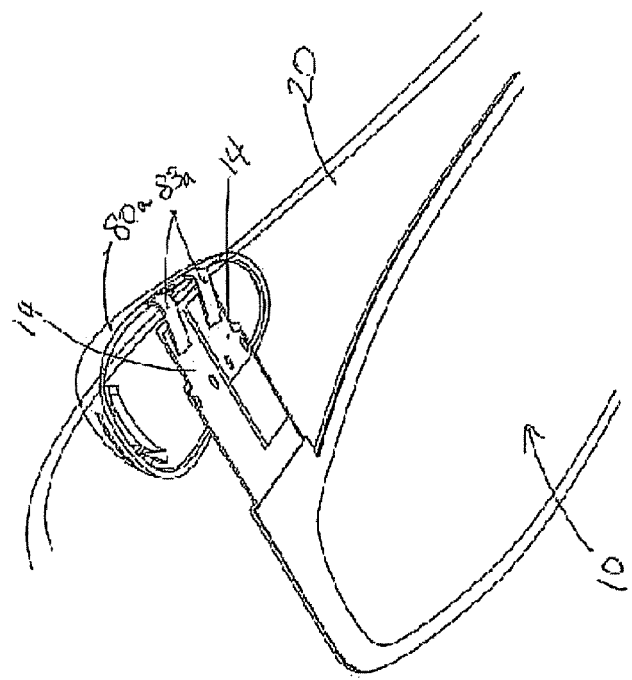
FIG. 26 is a partial rear perspective view of a helmet visor with an optical element electrically connected with a controller, the controller being connected to the helmet visor by a clip arrangement that serves both as an electrical connection and as a retainer for the controller.

Similar to the optical element itself, many different mechanisms and configurations may be utilized to attach a controller to an eye-shielding device, including mechanical, chemical, a combination of chemical/mechanical, friction or pressure, magnetic, hook and loop fastener (VELCRO®), or a combination thereof. For example, as illustrated in FIG. 24, a controller 80 may be provided with an adhesive pad 84 for attachment to a surface of the helmet visor 20, with the optical element 10 and the controller 80 being electrically connected by a wired connection 82 extending over an upper or lower edge of the helmet visor 20 for connection at an end plug 83 with conductive tabs 14 of the optical element 10. As another example, as shown in FIG. 26, a controller 80a may be clipped to an upper edge of the helmet visor 20, for example, by resilient prongs 83a, and may be electrically connected to the optical element tabs 14 by the resilient prongs 83a, or by any other suitable connection, including, for example, by conductive tape (not shown) adhered to the optical element tabs 14.

In other embodiments, a controller for an optical element may be configured to be automatically activated or adjusted by light intensity. In one example, a photoactivated control mechanism utilizing a photoreceptor, for example, a solar cell, photo resistor, or photo cell, may be configured to automatically activate or vary the voltage across the liquid crystal optical element in response to detection of varying intensities of light. This mode of activation may be utilized exclusively, or in addition to manually-controlled activation. In some embodiments, the solar cell acts purely as a photosensor providing a control signal to the controller.

In other embodiments, a solar cell may be provided as the primary or secondary power source, the automatic activating device, or both. The solar cell may generate an electrical current from the collected photons or radiation for delivery to a controller or control circuit, which may be configured to selectively or automatically deliver at least a portion of the electrical current to the liquid crystal cell of the optical element for energization of the liquid crystal cell to produce a darker tint, such that the tinting of the liquid crystal cell may be proportional to the amount or intensity of sunlight impinging on the optical element. In some embodiments, the controller adjusts the optical transmission to the liquid crystal cell by regulating the amount of voltage delivered to the cell (e.g., as applied to the cell electrodes, discussed in greater detail below).

Figure 27:
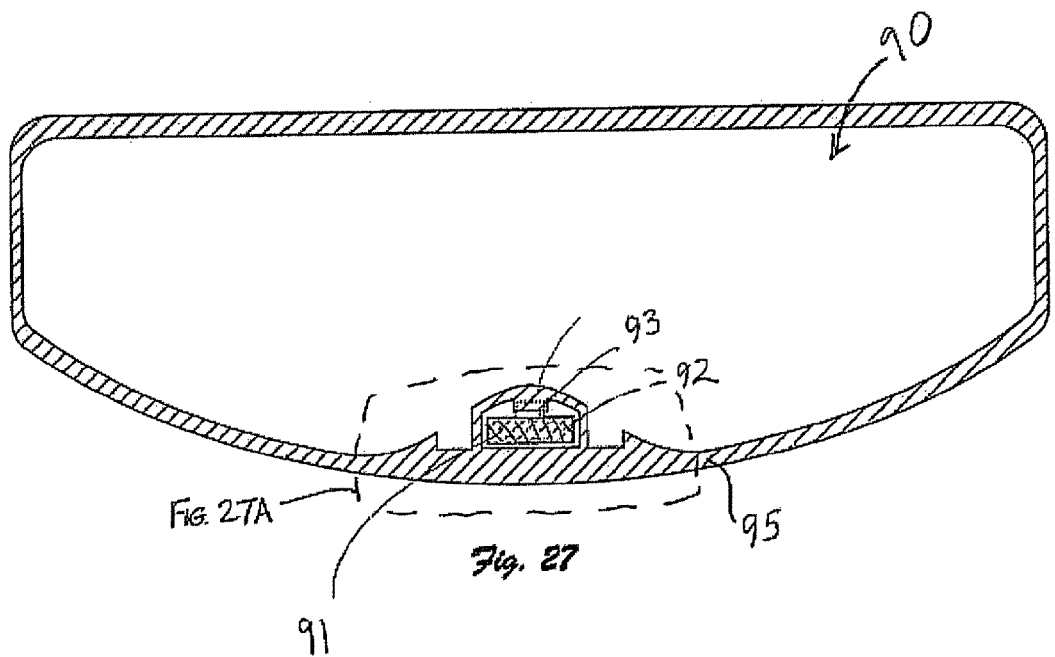
FIG. 27 is a front elevational view of an optical element incorporating a solar cell photoreceptor and controller as an integral part of the optical element.
Figure 27A:
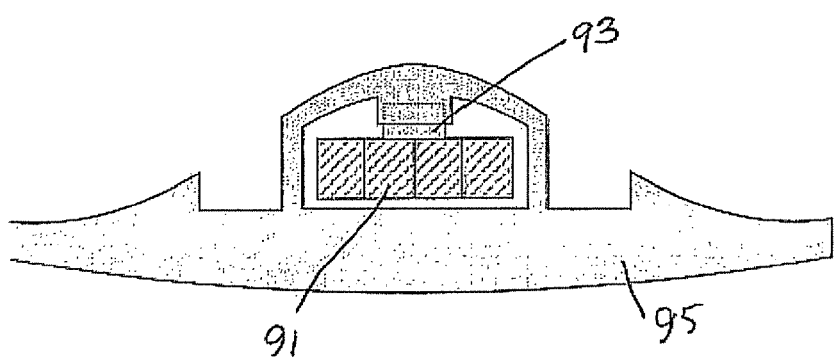
FIG. 27A is an enlarged view of the solar cell receptor of FIG. 27.
Figure 28:
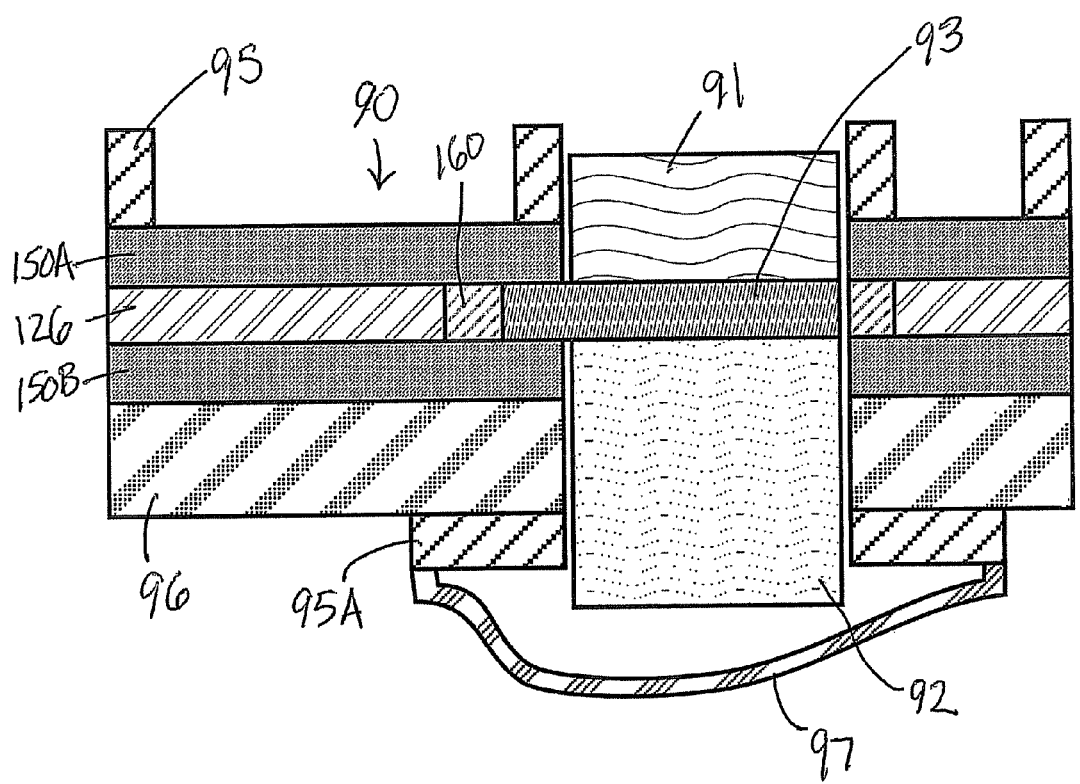
FIG. 28 is an elevational cross-sectional schematic of the solar cell-controller arrangement of the optical element of FIG. 27.

In one example illustrated in FIGS. 27-28, a solar cell 91 may be provided unitary with the optical element 90 to provide one or both of a primary or secondary power source and/or an automatic photo-responsive activating device of the optical element. As shown in FIG. 27, the optical arrangement may include a pad 95, as described in greater detail above, that surrounds both the optical element 90 and the solar cell 91, for example, to protect or seal the optical element 90 and the solar cell 91 from contamination. The unitary arrangement of the optical element 90 and solar cell 91 may facilitate installation of the optical arrangement during subsequent assembly of the optical arrangement to an existing visor.

In the embodiment of FIGS. 27 and 28, the solar cell 91 is disposed on the optical element so that it can detect light through the eye-shielding device. The exemplary solar cell 91 is not covered by the light attenuating optical element 90, such that a maximum amount of the light intensity impinging on the helmet visor reaches the solar cell 91. In other embodiments, the solar cell may be covered by the optical element to provide for an "equilibrium state" of attenuation that is automatically controlled by the solar cell 91, which may permit the solar cell to directly power the optical element without any intermediate circuitry. In such an embodiment, as the intensity of sunlight on the optical element increases, the solar radiation passing through the light attenuating layer to the solar cell (via the light concentrating layer) increases, and the solar cell may be configured to automatically deliver a voltage to the light attenuating layer to darken the tint (i.e., reduce the transmission of light). As the light attenuating layer darkens, a reduced amount of solar radiation reaches the solar cell, thereby reducing the voltage delivered to the light attenuating layer. As a result, the light attenuating layer will reach an equilibrium state at which a desired level of tinting is maintained with minimal fluctuations, and an excessive supply of voltage from the photovoltaic cells to the light attenuating layer is avoided.

FIG. 28 illustrates a schematic cross-sectional view of an optical arrangement having an optical element 90 with an integral solar cell 91 and controller 92. As shown, an inner pad 95 is secured to the optical element (on substrate 150A) to protect or seal the optical element 90 and solar cell 91 against the inner surface of the visor. An electrical connector 93 is interposed between the solar cell 91 and a controller or control circuit 92, so that the control circuit may control or modulate electric charge produced by the solar cell 91 for delivery to the optical element. The substrates 150A, 150B of the optical element receive the electrical connector 93 (e.g., an electrical interconnection tab, as described above) therebetween to provide electricity from the solar cell 91 and control circuit 92 to the electrodes (see FIG. 3) of the optical element 90. The control circuit 92 may be protected by a covering pad. For example, a second pad 95A may be used to provide a seal between the protective backfilm 96 of the optical element 90 and a protective cover 97 (e.g., a rubber cover or other seal) for the control circuit.

By providing the optical element, controller, and power source in a unitary panel, after market assembly of the optical arrangement to an existing helmet visor or other eye-shielding device is facilitated. No additional wiring or electrical connections must be made by the end user. Additionally, removal of the optical arrangement (e.g., for replacement or for assembly to a different eye-shielding device) may also be facilitated.

Figure 29:
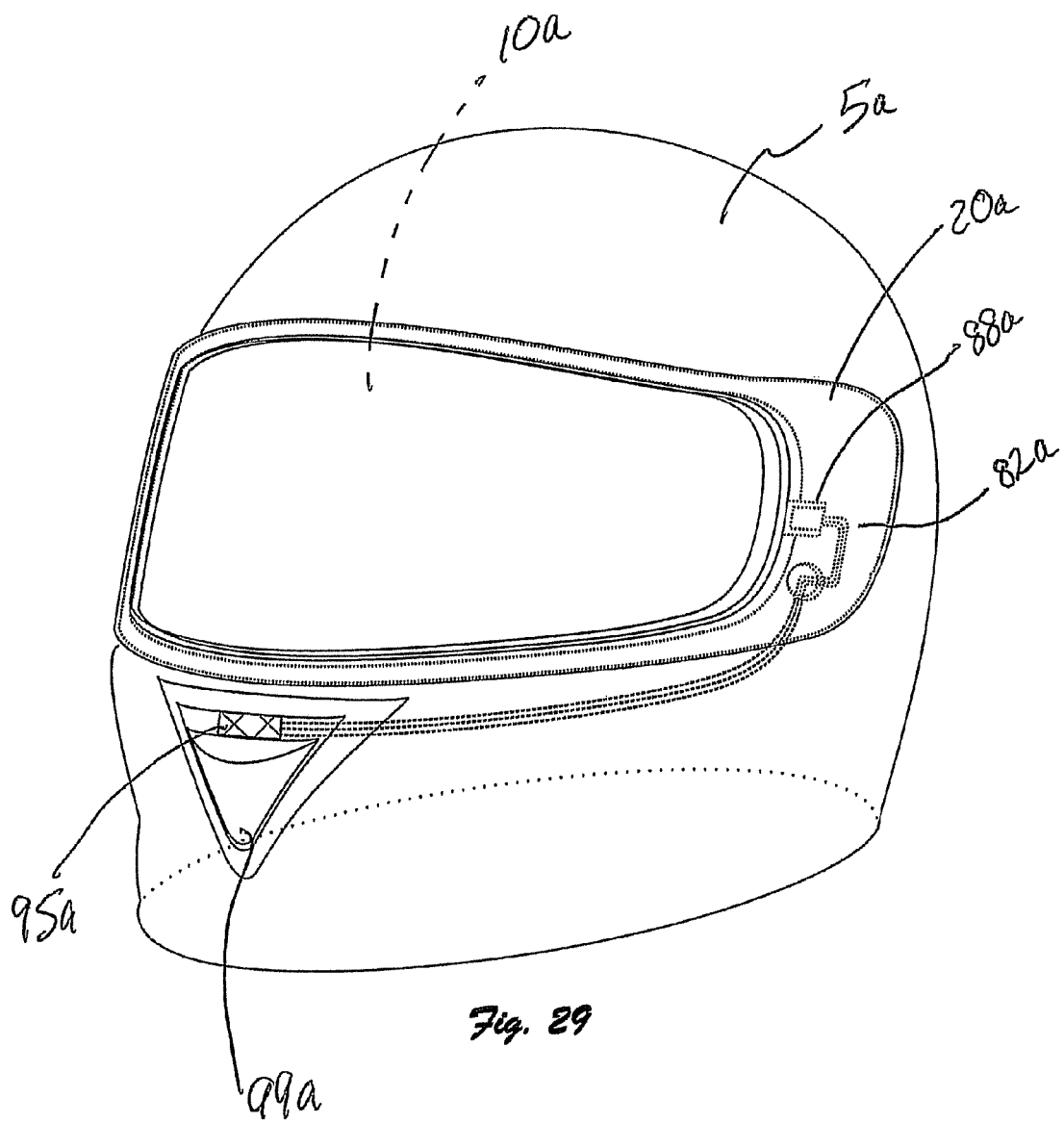
FIG. 29 is a front perspective view of a helmet with an electronically operable optical element electrically connected to a solar cell photosensor that is assembled within the helmet.

In another embodiment, as illustrated in FIG. 29, a solar cell 95a (or other photoreceptor) may be assembled with (i.e., integral to or detachable from) a helmet 5a for powering an electronically operable optical element 10a. In the illustrated embodiment, the solar cell 95a is assembled to a vented grill portion 98a of the helmet 5a, although other locations and mounting arrangements may be utilized.

While many different types of electrical connections between the optical element 10a and the solar cell 95a may be provided, in the illustrated embodiment of FIG. 29, a wired connection 82a extends from a controller 88a secured to an inner surface of the visor 20a to the solar cell 95a disposed on the helmet 5a. The controller 88a may be connected to the optical element 10a by a wire connection and/or an interconnecting tab, as described above. The solar cell 95a may also be the primary or secondary power source. Alternatively, another suitable power source may additionally be utilized to power the optical element, together with other electronic features of the helmet. Also, in other embodiments, the solar cell 95a may be configured to automatically control the optical element 10a (e.g., in response to exposure to sunlight), thereby eliminating the need for a separate controller 88a. In another example, the controller and the solar cell may form a unitary/ integral unit and fitted into any portion of the helmet visor, as described above and shown in FIGS. 27 and 28.

In still other embodiments, activation of the liquid crystal optical element may be both automatic (e.g., photo-induced) and manual or user operable (e.g., switch or button operated). This may provide a user with a manual override of the automatic setting to provide darker or lighter tinting of the optical element. In one such embodiment, a user operable switch or knob may be electrically connected with the controller to alter or interrupt the supply of voltage from the solar cell to the electrodes of the optical element. In another embodiment, a purely mechanical user override of the automatic light attenuation may be accomplished by providing a solar cell cover that may be selectively moved to cover the solar cell, thereby mimicking a lack of sunlight to cause the optical element to return to a clear or minimally tinted state. In one such embodiment, as shown in FIG. 29, a solar cell or photoreceptor cover 99a may be slideably connected with the helmet (or other eye-shielding device) for slideable movement between a solar cell covering and a solar cell uncovering position. The solar cell cover 99a may also be placed in one or more partially covering positions, to provide some amount of manual variability of light attenuation by the user. This solar cell cover 99a may also function as a vent cover for the helmet.

In still other embodiments (not shown), the activation circuit may be engaged remotely by a wireless activating device. This may permit inclusion of the wireless device on another part of the eye-shielding device or other component accessible to the user, such as, for example, a jacket, glove, or a portion of a motorcycle, e.g. the handlebars. Examples of wireless remote controls for electronically controllable optical elements are well known in the art. One such device is described in U.S. Pat. No. 7,342,210, the entire disclosure of which is incorporated by reference to the extent it is not conflicting with the present application.

In another aspect, the invention relates to one or more kits that comprise the various elements described herein, including the optical element, the controller, the power source, the means for attaching the optical element, the controller or both, to the eye-shielding device, and, in some cases, the remote control device, and an adapter or inverter for recharging the power source (e.g., by connecting the adapter to a USB port of the power source for connection with a wall socket).

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention.

We claim:

1. A kit for converting a helmet visor to a light attenuating helmet visor, the kit comprising:
    a flexible flat optical element comprising an electronically controlled cell for variably attenuating transmission of light, the cell including first and second plastic substrates having a gap between the substrates, the gap maintained by spacers and filled with an electro-optical fluid material;
    a controller and a power source configured to selectively supply a voltage across the electronically controlled cell;
    and one or more means for securing the flexible flat optical element and the controller and power source to the helmet visor, wherein the helmet visor is curved in at least one dimension.

2. The kit of claim 1, wherein the means for securing the optical element to the helmet visor comprises an adhesive means for detachably attaching the optical element to the inner surface of the helmet visor.

3. The kit of claim 1, wherein the means for securing the optical element to the helmet visor comprises an adhesive means for permanently attaching the optical element to the helmet visor.

4. The kit of claim 1, wherein the means for securing the optical element to the helmet visor comprises an adhesive disposed on at least a portion of an outer periphery of the optical element.

5. The kit of claim 1, wherein the power source is an integral part of the controller.

6. The kit of claim 1, wherein the power source and controller are housed within the optical element.

7. The kit of claim 1, wherein the power source is separate from the controller.

8. The kit of claim 1, wherein the optical element and the controller can be connected through a disconnectable arrangement.

9. The kit of claim 1, further comprising a manually operable activation device for remotely activating the controller.

10. The kit of claim 1, further comprising a photoreceptor configured to automatically activate or vary the voltage across the cell in response to detection of varying intensities of light.

11. The kit of claim 10, wherein the controller and photoreceptor are housed within the optical element.

12. The kit of claim 1, wherein the electronically controlled cell comprises a guest-host liquid crystal cell.

13. A kit for converting a curved pre-assembled helmet visor to a light attenuating helmet visor, the kit comprising:
    a flexible flat optical element comprising an electronically controlled guest-host liquid crystal cell comprising plastic substrates for variably attenuating transmission of light;
    a drive circuit configured to selectively supply a voltage across said liquid crystal cell;

a first adhesive securing means for attaching the flexible flat optical element to the curved pre-assembled helmet visor; and a second adhesive securing means for attaching the drive circuit to the curved preassembled helmet visor.

14. An optical enhancing arrangement comprising:

an optical element comprising an electronically controlled guest-host liquid crystal cell comprising flexible plastic substrates for variably attenuating transmission of light, and a controller electrically connected to said liquid crystal cell and configured to selectively supply a voltage across said liquid crystal cell, wherein the optical element is adhesively attached to a curved helmet visor.

15. The arrangement of claim 14, wherein the controller is attached to the helmet visor using at least one of a mechanical, chemical, pressure sensitive, magnetic, and hook-and-loop connection or a combination thereof.

16. The arrangement of claim 14, wherein the optical element or the controller or both, are permanently attached to the helmet visor.

17. The arrangement of claim 14, wherein the optical element or the controller or both are detachably attached to the helmet visor.

18. The arrangement of claim 14, wherein the power source and controller are housed within one integral unit.

19. The arrangement of claims 14, wherein the controller and power source are housed within the optical element.

20. The arrangement of claim 14, further comprising a photoreceptor electrically connected to the controller.

21. The arrangement of claim 20, wherein both the photoreceptor and the controller are housed within the optical element.

22. The arrangement of claim 14, wherein the controller further comprises a wireless transmitter or receiver.

23. The kit of claim 1, wherein the means for securing the controller to the helmet visor comprises an adhesive for permanent attachment of the controller to the helmet visor.

24. The kit of claim 1, wherein the controller comprises a drive circuit and an activating device that is separate from said drive circuit.

25. The kit of claim 1, wherein the controller comprises a drive circuit and an activating device that form one integral unit.

26. The kit of claim 1, wherein the first or second means for securing comprises at least one of a mechanical, chemical, pressure sensitive, magnetic, and hook-and-loop connection or a combination thereof.

* * * * *